(12) United States Patent
Cooper

(10) Patent No.: US 7,412,402 B2
(45) Date of Patent: Aug. 12, 2008

(54) PERFORMANCE MOTIVATION SYSTEMS AND METHODS FOR CONTACT CENTERS

(75) Inventor: Kim A. Cooper, 715 E. 100 N., Lindon, UT (US) 84042

(73) Assignee: Kim A. Cooper, Lindon, UT (US)

( * ) Notice: Subject to any disclaimer, the term of this patent is extended or adjusted under 35 U.S.C. 154(b) by 168 days.

(21) Appl. No.: 11/386,182

(22) Filed: Mar. 21, 2006

(65) Prior Publication Data
US 2006/0233121 A1 Oct. 19, 2006

Related U.S. Application Data

(63) Continuation-in-part of application No. 11/115,845, filed on Apr. 26, 2005, and a continuation-in-part of application No. 11/115,846, filed on Apr. 26, 2005.

(60) Provisional application No. 60/663,968, filed on Mar. 22, 2005.

(51) Int. Cl.
G06F 11/34 (2006.01)
(52) U.S. Cl. ........................................ 705/11
(58) Field of Classification Search ............. 705/11
See application file for complete search history.

(56) References Cited

U.S. PATENT DOCUMENTS

| | | | |
|---|---|---|---|
| 6,700,971 B1 | 3/2004 | Cohen et al. | |
| 6,782,093 B2 | 8/2004 | Uckun | |
| 6,823,315 B1 | 11/2004 | Bucci et al. | |
| 6,959,078 B1 | 10/2005 | Ellbacher et al. | |
| 6,970,831 B1 * | 11/2005 | Anderson et al. | 705/10 |
| 7,203,655 B2 * | 4/2007 | Herbert et al. | 705/11 |
| 2002/0046110 A1 | 4/2002 | Gallagher | |
| 2003/0004790 A1 | 1/2003 | Calderaro et al. | |
| 2003/0004847 A1 | 1/2003 | Calderaro et al. | |
| 2003/0200144 A1 | 10/2003 | Antonucci et al. | |
| 2003/0233278 A1 | 12/2003 | Marshall | |
| 2001/0056367 A1 | 3/2004 | Herbert et al. | |
| 2004/0177138 A1 | 9/2004 | Salle et al. | |
| 2004/0202308 A1 | 10/2004 | Baggenstoss et al. | |
| 2004/0202309 A1 | 10/2004 | Baggenstoss et al. | |

(Continued)

OTHER PUBLICATIONS

Nguyen et al "Agent Platform Evaluation and Comparison", Jun. 2002, Institute of Informations, pp. 1-15.*

(Continued)

Primary Examiner—Romain Jeanty
(74) Attorney, Agent, or Firm—Bryan G. Pratt; Rader Fishman & Grauer PLLC

(57) ABSTRACT

An embodiment of a system for optimizing agent performance includes a data collector configured to receive data representative of contact center statistics from a contact center and to use the statistics to calculate performance metrics. The system also includes a presentation module configured to provide data representative of the performance metrics to a client device configured to present the performance metrics for consideration by an agent associated with the contact center. The performance metrics are representative of agent performance in relation to at least one predefined performance threshold. In certain embodiments, the statistics include a customer satisfaction survey score that is based on actual feedback received from a customer. In certain embodiments, the performance metrics are provided to the client device in real time or near real time.

2 Claims, 10 Drawing Sheets

U.S. PATENT DOCUMENTS

2004/0210475 A1   10/2004   Starnes et al.
2004/0220852 A1   11/2004   Posey
2004/0243428 A1   12/2004   Black et al.
2004/0248070 A1   12/2004   Ancier

OTHER PUBLICATIONS

Christopher et al (The Choice of Performance Measures in Annual Bonus Contracts), Apr. 1997, The Accounting Review, pp. 231-255.*
Workstream Completes Acquisition of Bravanta to Strengthen Compensation Offerings; Transaction Completes End-to-End Incentive and Recognition Solution, Business Wire, Jul. 28, 2004, Workstream Inc; Bravanta Inc. pp. 1.
Workstream Signs Definitive Agreement to Acquire Bravanta, Business Wire, Jun. 30, 2004, Workstream Inc; Bravanta Inc. pp. 1.
Onyx and Concerto Software Announce Partnership; Companies to Promote Benefits of Linking CIM and CRM, Business Wire, Jun. 2, 2004, Onyx Software Corp; Concerto Software Inc. pp. 1.
Softscape Acquires the Nelson Group; Launches Management Consulting & Organizational Development Division, Business Wire, May 18, 2004, Softscape Inc; Nelson Group, pp. 1.
Time America and Cort Directions Partner to Integrate Time and Attendance with HRMS Solution, Business Wire, Apr. 1, 2004, Time America Inc; Cort Directions Inc, pp. 1.
Ceridian Forms Agreement with Softscape to Deliver Employee Performance and Development Solutions, Business Wire, Feb. 24, 2004, Ceridian Corp; Softscape Inc, pp. 1.
Name Change Helps API Software, Inc. Better Communicate Its Commitment to the Healthcare Industry; New Name, but Still Same Leading Technology from Wisconsin Vendor, Business Wire, Feb. 4, 2004, API Software Inc; Automating Peripherals Inc, pp. 1.
Blue Pumpkin Acquires Onward, Inc. Division to Boost Workforce Optimization Services, PR Newswire, Sep. 23, 2002, Blue Pumpkin Software; Onward Technologies Inc, pp. 1.
Hands-off Management, San Francisco Business Times, v16n13, Nov. 2, 2001, Periodical, ISSN 0890-0337, pp. 17.
Sunrise Growers Selects Kronos to Match Workforce to Seasonal Demands, Business Wire, Feb. 22, 2005, Kronos Inc; Sunrise Growers Inc.
Angel.Com Announces Availability of 'Virtual Call Center', PRNewswire, MicroStrategy Inc, Virginia, RCNAUSA.
Synygy Grows Revenue, Profit, and Cash in 2004 to Achieve 14th Record Year; Synygy Ends the Year with Nearly 500 Employees Globally, Business Wire, Feb. 1, 2005, Synygy Inc, Conshoohocken, PA.; RCNAUSA.
Frost & Sullivan Names Blue Pumpkin as Recipient of 2004 Product Differentiation Innovation Award, Business Wire, Dec. 15, 2004, Frost Blue Pumpkin Software Inc; Blue Pumpkin Advisor Express, Pao Alto, CA; RCNAUSA.
Unitime Systems Introduces Incentive Trackin Feature for ITs Automated Timekeeping System, Business Wire, Dec. 1, 2004, UniTime Systems Inc, Boulder, CO; RCNAUSA.
Workstream to Showcase Rewards Offerings at Motivation Tradeshow, Business Wire, Sep. 28, 2004, Workstream Inc, Chicago; RCNAUSA.
Online Performance Incentives. (In short)(Brief Article)(Product Announcement), Information Week, Jan. 22, 2001, BeyondWork Inc, Product Introduction, Copyright 2001 CMP Media, Inc, ISSN 8750-6874, pp. 109.
Balanced Scorecard Collaborative honors pbviews Customer, Media General, With Prestigious Hall of Fame Award, PR Newswire, Oct. 21, 2004, pp NA.
Balanced Scorecard Collaborative Honors Canon, Chrysler, Cognos, Media General, and Motorola with Prestigious Hall of Fame Award; Breakthrough Performance REsults Lauded at North American Summit, PR Newswire, Oct. 13, 2004, pp NA.
CorVu Launches Industry's Most Comprehensive Performance Management Application, PR Newswire, Oct. 19, 2004, Minnesota; RCNAUSA.
Mark W. Morgan. Customer-Focused Scorecards: Measuring the Right Things. See pp. 1-49.

* cited by examiner

Meaning

Quality
Overall Performance Weight: 15%
Performance Type:
Your Quality based on
▸ Adherence
▸ Certifications
▸ Peer Rating

Details

Certifications
Already done: 8 Certifications
Overdue: 1 Certification
Due this month: 2 Certifications

Peer Quality Survey
Average for preceding 4 weeks: Good

Quality Scores
90% Schedule adherence score
80% Certification requirements score
75% Peer quality score
82% Your Cumulative Quality Score 85% Minimum daily quality score to qualify for Bonus More Information Toggle Button: on break    At Work    Incidents
                                      Task 1
                                      Task 2

My Bonus
• day    $ .6
• period $ 1,437
• ytd    $ 4,201

Day View ▼    Year View ▼

My Performance Goals volume
customer satisfaction
quality
performance score 390              390 points Amount earned for the company:
$ 23.46

Daily Performance Leaders
3:00 p.m. - 4:00 p.m.

Kimberly Dawn, Team A, 401 point
John Doe, Team B, 420 points
Sarah Wilson, Team C, 405 points
Jim Jackson, Team B, 425 points

My Daily Statistics
calls taken                        9
chat incidents closed              15
email incidents closed             7
average handle time max            7:43
handle time                        18:23
min handle time                    2:14
team average handle time           49:31
call-backs closed                  2

Perks
Make the margin 5 times a month and win: Armani suit or a dinner for two!
Your status: 10 margins out of 14

Make your monthly score 6 times and win: trip to Rome or a new living room!
Your status: 2 bonuses out of 8

Meaning

Volume

Overall Performance Weight: 45%
Performance Type:
Your Volume based on
▸ Labor Cost
▸ Incident Value
▸ Daily Volume

Details

Labor Cost per Day

| | |
|---|---|
| Salary | $ 174.25 |
| Benefits | $ 52.28 |
| Overhead | $ 73.05 |
| Total Cost per day | $ 279.58 |

Incident Values
(displays last 5 incidents)

| | |
|---|---|
| Incident number1 | $ 15.38 |
| Incident number2 | $ 5.05 |
| Incident number3 | $ 2.24 |
| Incident number4 | $ 17.52 |
| Incident number5 | $ 15.38 |
| Incidents Total | $ 15.38 |

Bonus by Incident

Per Bonus Incident $ 5.00

You are in the Alert Area

This far you have generated less than 50% of your cost.

More Information

Meaning

Customer Satisfaction

Overall Performance Weight: 15%
Performance Type:
Your Customer Satisfaction based on
▸ Real Time Surveys
▸ Historical Average
▸ Industry Average

Details

Customer Surveys Today: 11
Today's Avg. CS Scores: 72%

| | |
|---|---|
| Access to the agent? | 6 |
| Time it took for solution? | 7 |
| Agent's professionalism? | 6 |
| Agent's technical knowledge? | 9 |
| Satisfactory solution? | 6 |
| Recommend our company? | 5 |
| Total Average Score: | 6 of 10 points |

Customer Satisfaction Scores

83% Average Historical CS Score
85% Average Industry CS Score
80% Your Cumulative CS score 82% Minimum daily CS score to qualify for Bonus Depending on Agent's current status More Information

630

PERFORMANCE MOTIVATION SYSTEMS AND METHODS FOR CONTACT CENTERS

RELATED APPLICATIONS

The present application is a continuation in part of U.S. patent application Ser. No. 11/115,845, by Kim A. Cooper, filed Apr. 26, 2005, and entitled "Performance Motivation Systems and Methods for Contact Centers," which application claims priority under 35 U.S.C. §119(e) to U.S. Provisional Patent Application Ser. No. 60/663,968, by Kim A. Cooper, filed on Mar. 22, 2005, and entitled "Systems and Methods for Optimizing Agent Performance." The present application is also a continuation in part of U.S. patent application Ser. No. 11/115,846, by Kim A. Cooper, filed Apr. 26, 2005, and entitled "A Graphical Tool, System, and Method for Visualizing Agent Performance," which application claims priority under 35 U.S.C. §119(e) to U.S. Provisional Patent Application Ser. No. 60/663,968, by Kim A. Cooper, filed on Mar. 22, 2005, and entitled "Systems and Methods for Optimizing Agent Performance." The present application also claims priority under 35 U.S.C. §119(e) to U.S. Provisional Patent Application Ser. No. 60/663,968, by Kim A. Cooper, filed on Mar. 22, 2005, and entitled "Systems and Methods for Optimizing Agent Performance." The contents of each of the above-listed applications are hereby incorporated by reference in their entirety.

BACKGROUND

It is not uncommon for businesses to expend significant amounts of money and resources to maximize the performance of employees. This is especially true for employees who may impact the reputation of a business by dealing directly with its customers. For example, many businesses operate or contract customer service centers (e.g., call centers) to provide services to customers. The customer service centers typically employ agents to interface with customers and/or potential customers by way of telephone calls, e-mail messages, or other forms of communication. Because of the direct communication between customer service agents and customers, the agents are in positions that may significantly influence the reputation of a business. Consequently, customer service centers spend significant efforts to train their agents to provide effective and timely customer service.

The skill, training, motivation, and performance of call center agents are significant factors that contribute to the success of a call center. In particular, the profitability of a call center is influenced by the quality of customer service provided by agents, as well as by the volume of interactions handled by the agents. Unfortunately, many agents are unaware of the extent to which they influence the success of a call center. Specifically, agents are typically unaware of the real-time performance levels required to cover the overhead and profit margins of the call center.

Many technologies have been introduced to help call centers succeed. Examples of such technologies include automated computer systems designed to track statistics of call centers. For example, call analytics such as the number of calls handled, the lengths of the calls, the number of incidents resolved, and the average time to handle incidents are typically tracked by call center systems. These statistics are sometimes used by managers to analyze the performance of the call center. For example, managers often use the statistics in periodic performance reviews to help train call agents.

Other technologies have been introduced for using call center statistics to monitor and report the performance of agents. Some such technologies are even designed to provide agents with variable compensation based on the performance levels of the agents. This is intended to motivate the agents to improve their performance levels in order to increase their payouts.

While existing performance management technologies may have helped to automate some performance management tasks, there remains room for improvement. For example, existing performance management technologies are costly. One significant cost of existing technologies results from the difficulties involved in integrating the technologies with existing call center systems. Call center systems typically use a wide variety of native computing platforms, languages, and protocols. Consequently, existing performance management technologies have traditionally required significant investment for integration with call center systems, as well as for maintenance of the integrated technologies. The costs are often significant enough to dissuade small and medium-size call centers from making such an investment.

Moreover, many call centers are reluctant to provide full access to their computing systems, especially when trade secrets and industry know-how are contained in the systems. This poses a significant problem because significant access is required to integrate existing performance management technologies with call center systems.

Because of the difficulties, costs, and complexities involved in the integration of existing performance management technologies, manual entry of call center statistics is still widely used. For example, a call center typically includes several different computing tools for tracking and recording call center statistics. Because the computing tools are often implemented in different computing languages and platforms, many existing performance management technologies cannot be practicably interfaced with all of the different computing tools used in all call centers. As a result, many call centers rely upon manual entry of some statistics for use in existing performance management technologies. Manual entry introduces delays and errors into performance management, thereby preventing real-time performance-based motivation.

Another shortcoming of existing performance management technologies can be described as an inability to maximally motivate agents. In particular, several existing technologies seek to motivate agents by informing them of their performances. While this may help motivate agents to increase performance to some degree, these technologies do not maximize the value that may be provided by agents because the agents are not informed of their performances in a manner that encourages self-motivation to add value to the call center. For example, agents may be informed of their performance statistics (e.g., call volume), but the performance statistics are typically provided in a manner that leaves the agents uninformed as to how their performances immediately affect the success of the call center. To illustrate, agents are not typically informed as to how their performances relate to the overhead, profitability margins, and financial success of a call center. Agents left unaware of their values to the call center typically fall short of consistently adding value to the call center. Thus, existing technologies do not provide performance measurements in a manner that encourages maximum self-motivation among agents.

The above-described shortcomings of existing performance management technologies are highlighted by the continuously high attrition rate of call center agents. Even when call centers provide competitive salaries and traditional performance motivators, call center agents continue to experience high turnover rates. Consequently, call centers are forced to spend additional money to recruit and train new agents. The recruitment and training of rookie agents requires significant expenditures that erode profitability.

At least part of the high turnover rates may be attributable to the failure of call centers and existing technologies to focus on the satisfaction and self-motivation of agents. The attention of many existing call centers has been so focused on pleasing customers or motivating agents through variable compensation and peer comparison that existing performance management technologies have failed to consider the importance associated with providing agents with fulfillment, self-motivation, and satisfaction in a manner that also promotes the attainment of the goals of call centers. More specifically, traditional performance management tools have failed to inform agents of their value to the call center. The traditional tools have also failed to instill in agents the self-motivation to add value to and work for the success of a call center. Consequently, high attrition rates among agents have continued and even increased over the last few years.

SUMMARY

An embodiment of a system for optimizing agent performance includes a data collector configured to receive data representative of contact center statistics from a contact center and to use the statistics to calculate performance metrics. The system also includes a presentation module configured to provide data representative of the performance metrics to a client device configured to present the performance metrics for consideration by an agent associated with the contact center. The performance metrics are representative of agent performance in relation to at least one predefined performance threshold. In certain embodiments, the statistics include a customer satisfaction survey score that is based on actual feedback received from a customer. In certain embodiments, the performance metrics are provided to the client device in real time or near real time.

BRIEF DESCRIPTION OF THE DRAWINGS

The accompanying drawings illustrate various embodiments of the present methods and systems and are a part of the specification. Together with the following description, the drawings demonstrate and explain the principles of the present methods and systems. The illustrated embodiments are examples of the present methods and systems and do not limit the scope thereof.

FIG. 6A is an illustration of the agent view of FIG. 5 and an explanatory window pane displayed adjacent to the agent view, accordingly to an exemplary embodiment.

FIG. 6B is an illustration of another explanatory window pane, accordingly to an exemplary embodiment.

FIG. 6C is an illustration of yet another explanatory window pane, accordingly to an exemplary embodiment.

Throughout the drawings, identical reference numbers designate similar, but not necessarily identical, elements.

DETAILED DESCRIPTION

Figure 1:
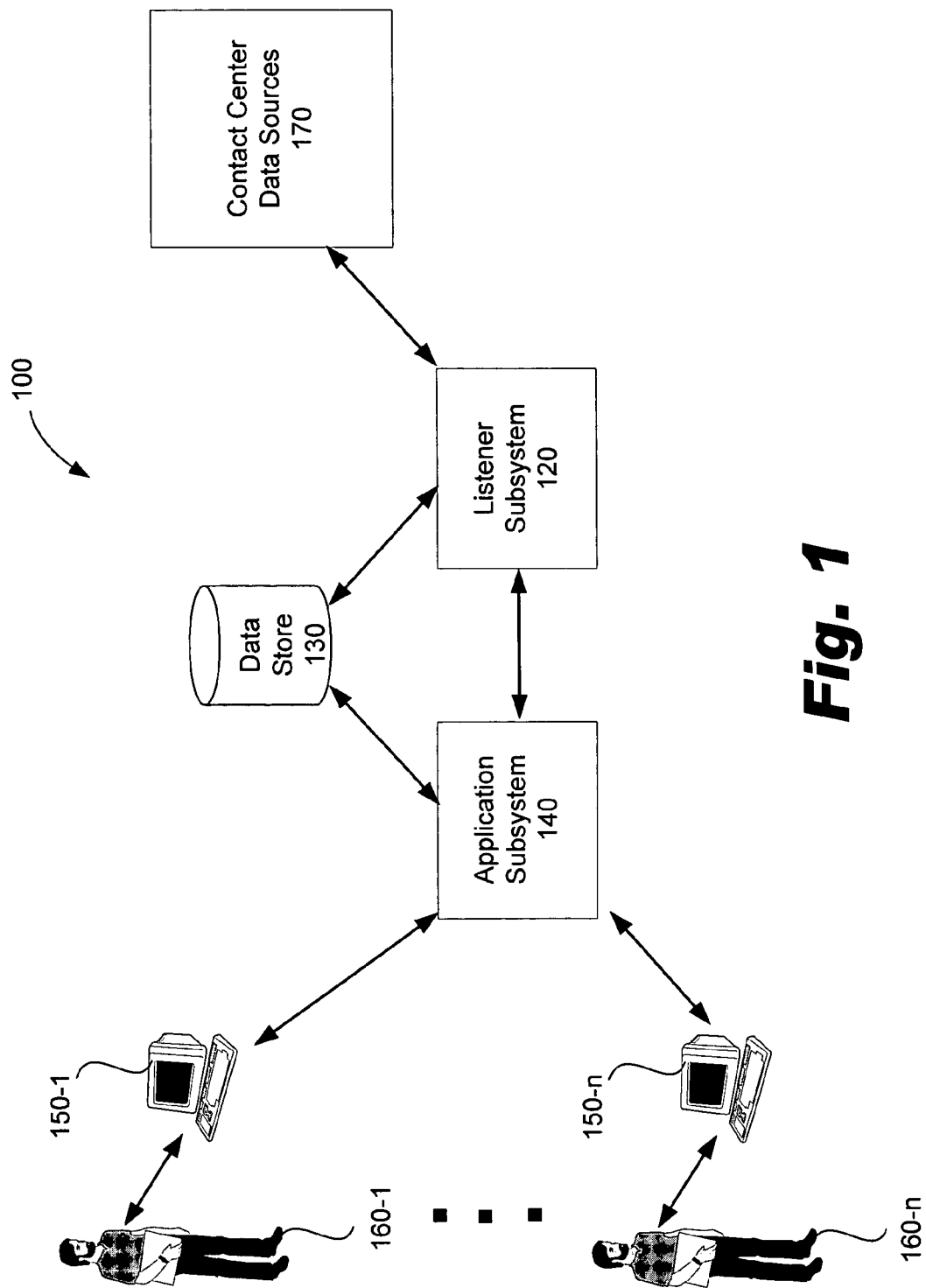
FIG. 1 is a block diagram illustrating a performance motivation system for contact centers, according to an exemplary embodiment.

The present specification describes methods and systems for providing visual performance motivation. Certain examples of the present systems and methods use service-oriented architecture to acquire statistics from contact center data sources, calculate performance metrics based on the statistics, and present the performance metrics on client devices ("clients") for consideration by users of the clients. In certain embodiments, the performance metrics are presented in real time or near real time. The performance metrics and other information presented to users are designed to motivate the users to maximize their performances. Some examples of the present systems and methods may use web services to connect to the contact center data sources.

In the present specification and in the appended claims, the term "service-oriented architecture" is meant to be understood broadly as a software architecture providing loosely coupled, highly interoperable services to connected computing devices. Service-oriented architectures are able to make computing resources available to connected computing devices as independent services that may be accessed in a standardized way. Service-oriented architectures allow services to be provided regardless of the platform or technology of a computing device requesting the services. Service-oriented architectures allow services to interface with the computing devices in a lightweight and non-invasive manner, which makes the present systems and methods easy to interface with contact center applications. Further, the lightweight configuration of the present systems and methods reduces implementation, maintenance, and support costs associated with interfacing with contact center applications. The service-oriented architectures may utilize web services technology.

The term "web services" is meant to be understood as any mechanism(s) for connecting computing applications regardless of the technology, location, and platform of the applications. With web services, computing applications can dynamically interact with other computing applications using one or more standardized communications protocols (e.g., XML, SOAP, HTTP, WSDL, and/or UDDI). Web services are able to provide added-value services to connected computer programs with reduced or no manual input. Web services may allow computing applications on a hosted server to be made available for use by connected users or computer programs. Web services usually include some combination of computer programming and data, but may include human resources as well. As known to those skilled in the art, web services are not limited to web-based connections and may be used to loosely couple computing applications across a wide variety of different connections, including but not limited to local area networks, wide area networks, the Internet, and other known types of connections.

The term "incident" is meant to be understood as a communication instance being processed by a contact center. The incidents are typically handled by contact center agents. In the case of a call center, for example, a telephone call handled by an agent may be referred to as an incident.

The term "agent" is meant to be understood broadly as any person or entity participating in the handling of contact center incidents, including employees and independent contractors. In the case of a call center, for example, an agent may handle a telephone call by communicating with another party (e.g., a customer or potential customer) to resolve any questions or concerns, collect survey information, or solicit a sale or contribution.

In certain examples of the present methods and systems, the performance metrics are representative of agent performance in relation to at least one predefined performance threshold. Presentation of the measured performance of an agent in relation to the predefined threshold or thresholds is designed to help motivate the agent to increase his or her performance. In certain embodiments, the performance metrics are provided to the client device in real time or near real time so that the agent is presented with positive immediate consequences based on his or her performance. In certain embodiments, the statistics include a customer satisfaction survey score that is based on actual feedback received from a customer. Accordingly, the performance metrics may be based on the customer satisfaction survey score, which may be presented for consideration by the agent. The exemplary systems and methods may reward the agent when the performance metrics indicate that the performance of the agent is at least a predetermined margin above the predefined performance threshold.

In the following description, for purposes of explanation, numerous specific details are set forth in order to provide a thorough understanding of exemplary methods and systems for motivating agent performance. It will be apparent, however, to one skilled in the art that the exemplary methods and systems may be practiced without these specific details. Reference in the specification to "one embodiment" or "an embodiment" means that a particular feature, structure, or characteristic described in connection with the embodiment is included in at least one embodiment. The appearances of the phrase "in one embodiment" in various places in the specification do not all necessarily refer to the same embodiment.

I. Exemplary System Elements

FIG. 1 is a block diagram illustrating a performance motivation system (100) (or simply "the system (100)") for contact centers, according to one exemplary embodiment. The system (100) may be configured in a service-oriented architecture and may be implemented as software instructions, or other forms of computing instructions, on one or more computer-readable mediums. The instructions may be configured to direct operations of one or more computing devices (e.g., one or more servers). In many embodiments, the system (100) is implemented as one or more hosted applications operating on one or more servers such as web servers (not shown). In other embodiments, the system (100) may be implemented as a combination of hosted and distributed applications, as described in more detail further below.

As illustrated in FIG. 1, the system (100) includes a listener subsystem (120), a data store (130), and an application subsystem (140). The application subsystem (140) is communicatively coupled to clients (150-1 through 150-n) (collectively "the clients (150)"). The clients (150) are accessible to users (160-1 through 160-n) (collectively "the users (160)").

The listener subsystem (120) is communicatively coupled to contact center data sources (170). The listener subsystem (120) may be configured to acquire information, including contact center statistics, from the contact center data sources (170) and to store at least a subset of the acquired information in the data store (130). Alternatively, the listener subsystem (120) may send the acquired information to the application subsystem (140), which can store at least a subset of the acquired information in the data store (130). The application subsystem (140) is configured to access, retrieve, and aggregate information stored in the data store (130). The application subsystem (140) may use the acquired information to calculate agent performance metrics. The agent performance metrics and other information may be processed and sent to the clients (150) in a form suitable for being presented for consideration by the users (160). Each of these elements will now be described in more detail.

A. Contact Center Data Sources

The contact center data sources (170) may include any tools and technologies useful for operating a contact center, including but not limited to computer-automated applications for directing incoming messages (e.g., incoming telephone calls, chat messages, or e-mail messages) to appropriate agents, recognizing input (e.g., voice or dual-tone multi-frequency ("DTMF") inputs), managing customer relationships (e.g., customer relationship management ("CRM") tools), storing and accessing data, tracking billing and accounting functions, calculating agent expenses (e.g., overhead), calculating contact center profitability margins, tracking human resources information, etc. The contact center data source (170) may include any known technology for monitoring statistics associated with the call center, including statistics related to call analytics, incidents, agent activity, incoming and outgoing communications, lengths of time spent handling incidents, call transfers, call resolution, customer feedback data (e.g., customer satisfaction survey data), expenses, schedule compliance, peer reviews, certifications, etc. The contact center data sources (170) may be configured to operate with various types of contact centers, including customer service centers and call centers. The contact center data sources (170) may be configured to process any suitable form of communication, including e-mail messages, chat messages, telephone calls, and other known forms of communication.

As known to those skilled in the art, contact center data sources (170) may be configured to collect and store statistics (sometimes referred to as "silo data") related to the operation of the contact center. As discussed below, the statistics may be made available to the application subsystem (140) for use in calculating agent performance metrics. In many embodiments, the contact center data sources (170) are loosely coupled to one or more components of the system (100) by way of a service-oriented architecture such that the system (100) may conveniently interface with and provide services to the contact center data sources (170). By using a service-oriented architecture loosely coupled to the call center data sources (170), the system (100) can be implemented to operate on top of contact center data sources (170) and other contact center applications. This allows easy and non-invasive interfacing of the system (100) with contact center data sources (170) of many different platforms and technologies, which makes the system (100) easy to interface with contact center applications. Further, the lightweight configuration of the system (100) reduces implementation, maintenance, and support costs associated with interfacing with contact center applications.

B. Users

The users (160) are typically human beings who can utilize the clients (150) to interface with the application subsystem (140). However, the users (160) may be other living organisms, automated agents, or forms of intelligence technology configured to provide input to and/or consider output from the system (100). The users (160) may be assigned different roles having particular privileges with the system (100). For example, the users (160) may be assigned roles such as agent, team leader, manager, and administrator. An agent may be given privileges for accessing agent-specific information and screens, while a team leader may be given privileges for accessing team-specific information, including information associated with any agent of the team. Administrators and/or managers may be given full administrative privileges, including privileges for configuring the settings of the system (100). When a particular user (160) logs into the system (100), the system (100) is able to present appropriate user interfaces to the user (160) based on the role and privileges assigned to the user (160).

C. Clients

The clients (150) may include any devices physically or remotely accessible to the users (160) and that allow the users (160) to provide input to, receive information from, or otherwise access the system (100). For example, the clients (150) may include, but are not limited to, desktop computers, laptop computers, workstations, personal data assistants, cellular telephones, satellite pagers, wireless internet devices, embedded computers, video phones, network interface cards, mainframe computers, mini-computers, programmable logic devices, vehicles, entertainment devices, gaming devices, telephony devices, and other future devices that may not yet currently exist. The clients (150) may include various peripherals such as a terminal, keyboard, mouse, screen, printer, stylus, input device, output device, or any other apparatus that can help relay information between the users (160) and the application subsystem (140).

Each of the clients (150) typically includes instructions that may be executed by a processor (not shown) to enable communication with the application subsystem (140). The instructions may be in any computer-readable format, including software, firmware, microcode, and the like. In one embodiment, the clients (150) are equipped to communicate with the application subsystem (140) over a network such as the Internet (not shown in FIG. 1). Any known connection may be used to connect the clients (150) with the application subsystem (140), including secure web services connections.

The clients (150) may be equipped to operate web browsers, including known web browsers such as Internet Explorer®. Through web browsers, the users (160) are able to access the functionality of the system (100). In particular, the web browsers are able to forward requests for information to the application subsystem (140), as well as display any retrieved information for viewing by the users (160). Several exemplary graphical views provided by the system (100) for presentation on the clients (150) will be described further below.

Although not shown in FIG. 1, the clients (150) may be connected to the contact center data sources (170) for purposes of contact center operations. For example, the clients (150) may comprise agent workstations running contact center software programs such as those designed to assist agents in the routing and handling of contact center incidents (e.g., customer calls and requests). Accordingly, the contact center data sources (170) may be able to monitor activity occurring on the clients (150). As discussed below, the system (100) is able to acquire and utilize monitored contact center information (e.g., performance statistics) to motivate agent performance.

D. Listener Subsystem

The listener subsystem (120) may be configured to acquire information from the contact center data sources (170). Any information made available by the contact center data sources (170) may be acquired by the listener subsystem (120), including any of the statistics described above.

In some embodiments, the listener subsystem (120) may be configured to remotely acquire information from the contact center data sources (170). For example, the listener subsystem (120) is capable of acquiring information over a network (e.g., the Internet) or other known connection by listening for predefined events associated with the contact center data sources (170). In some embodiments, the listener subsystem (120) is configured to receive information from the contact center data sources (170) using web services. In other words, the information may be acquired in a web services protocol format. Accordingly, contact center data sources (170) are able to make information available simply by converting it to a web services protocol format for transmission to the listener subsystem (120). Of course, other suitable types of communications (e.g., e-mail messages, hypertext transfer protocol ("HTTP") messages, and file transfer protocol ("FTP") messages) may be used to communicate data from the contact center data sources (170) to a remotely located (e.g., hosted) listener subsystem (120).

In other embodiments, the listener subsystem (120) may form an integral part of, or at least be implemented proximate to, the contact center data sources (170). Accordingly, the listener subsystem (120) and the contact center data sources (170) may be connected by any known local connections. Exemplary remote and integral implementations of the listener subsystem (120) will be described further below.

The listener subsystem (170) may save some or all of the acquired data to the data store (130) for later use by the system (100). In certain embodiments, the listener subsystem (120) is able to acquire and store information in real time, or at least in substantially real time. The listener subsystem (120) may also be configured to acquire and store information from the contact center data sources (170) and periodically provide the acquired information to the application subsystem (140) in batches.

E. Data Store

The data store (130) may comprise one or more storage mediums or devices. The data store (130) may employ any type and form of storage media known to those skilled in the art. The data store (130) may be configured to store predefined data, as well as information acquired by the listener subsystem (120). The information may include any of the information acquired by the listener subsystem (120), as described above. The predefined data may include information predefined by an administrator or manager. For example, the data store (130) may include information representative of performance goals and thresholds, rewards, reward thresholds, reward codes, agent costs, overhead costs, profitability margins, agent statuses, team statuses, bonus information, bonus thresholds, perks, perk thresholds, money generated by agents, contest rules, agent identifiers, agent information (e.g., direct deposit information), performance metric heuristics, and any other information that may be used to motivate agent performance.

The data store (130) may also store configuration data for the system (100), including data provided through administrative functions of the system (100). For example, stored administrative data may include agent profiles, company profiles, team profiles, task assignments, and any other type of configuration information.

The data store (130) may include predefined back-up settings that may be configured for use when up-to-date information acquired by the listener subsystem (120) is unavailable. For example, if the connection between the listener subsystem (120) and the application subsystem (140) or data store (130) is temporarily unavailable, the system (100) may use the predefined settings as a back-up to the acquired information. Administrators may define the settings based on historic performance levels or other factors useful for estimating actual performance statistics. Alternatively, the system (100) may be configured to automatically determine back-up settings based on historic performance levels.

The data store (130) may include any known technologies useful for storing and accessing information. For example, the data store (130) may include structured query language ("SQL") technologies, including an SQL or MySQL server. The data store (130) may include one or more databases, which may be in the form of relational databases.

F. Application Subsystem

The application subsystem (140) is configured to receive information obtained by the listener subsystem (120). The information may be obtained directly from the listener subsystem (120) and/or from the data store (130). In some embodiments, the application subsystem (140) uses web services to receive information from the listener subsystem (120).

The application subsystem (140) is able to search for and retrieve information from the data store (130). The application subsystem (140) can include or communicate with a search server (e.g., an SQL server) configured to search the information in the data store (130). Accordingly, the application subsystem (140) is able to identify at least a subset of the information in the data store (130), based on a search request.

The application subsystem (140) includes predefined instructions and logic capable of formatting, transforming, organizing, aggregating, and otherwise processing information retrieved from the data store (130). In particular, the application subsystem (140) is configured to organize and provide formatted information to the clients (150) in a manner that can be presented to the users (160). For example, the application subsystem (140) may be configured to use information (e.g., agent statistics) retrieved from the data store (130) to calculate agent performance metrics. The performance metrics include information depicting performance levels of agents, based on information acquired by the listener subsystem (120). The performance metrics may further include performance thresholds and rewards that are provided when agent performance levels reach the performance thresholds. Performance information, rewards, and the relationship between the performance information and the rewards may be presented to agents in real-time (or near real time) so that the agents are able to consider the immediate consequences of their performances. In other words, the performance metrics may be presented as a real-time visual gauge that depicts the immediate consequences of agent performance. In accordance with principles of behavioral science, the awareness of immediate consequences tends to facilitate agent self-motivation, which encourages maximized performance.

The application subsystem (140) may associate agent performance metrics with agent scorecards, which may be sent to the clients (150) for presentation to the users (160). The agent scorecards may be presented to the users (160) in graphical form. In some embodiments, for example, the application subsystem (140) includes one or more web servers configured to send web pages containing the agent scorecards to the client device (150). The client device (150) may display the web pages to the user (160) using a web browser or other suitable application, as described above. An exemplary embodiment of an agent scorecard will be described in detail below.

The application subsystem (140) may be implemented as a web services application, or group of web services applications, running on one or more servers. In an exemplary embodiment, the application subsystem (140) is implemented in the form of a ".NET" application running on an Internet information server, as will be understood to those skilled in the art. By using web services, the system (100) is able to acquire and provide real-time up-to-date information for presentation on the clients (150). Contact center data source (170) of many different technologies and computing platforms can be easily expanded to interface with the listener subsystem (120) and/or the application subsystem (140) by providing data in web services protocol formats. Thus, the use of web services provides a platform-independent interface with the system (100) so that many different types and configurations of contact center data sources (170) may be conveniently and cost-effectively interfaced with the system (100). The use of web services reduces, or even eliminates, manual entry of contact center statistics, thereby providing automatic acquisition of a wide range of statistics that may be used to motivate agent performance.

The application subsystem (140) may be configured to present information to the client device (150) in real time (or near real time) so that users (160) are able to view up-to-date performance information (e.g., performance metrics). The information may be transmitted to the clients (150) in any suitable format, including hypertext markup language ("HTML") messages. With real-time information being displayed by the clients (150), users (160) are able to know immediately, or at least nearly immediately, their statuses with respect to current performance levels, bonuses, rewards, value to the call center, current activity, incentives being offered, agent overhead costs, profit margins, and any other information helpful for motivating the user (160) to perform by providing immediate feedback as to how the current performance of the user (160) adds value and qualifies for rewards. Again, the indication of immediate consequences tends to facilitate agent self-motivation, which encourages maximized performance.

II. Exemplary System Implementations

Figure 2:
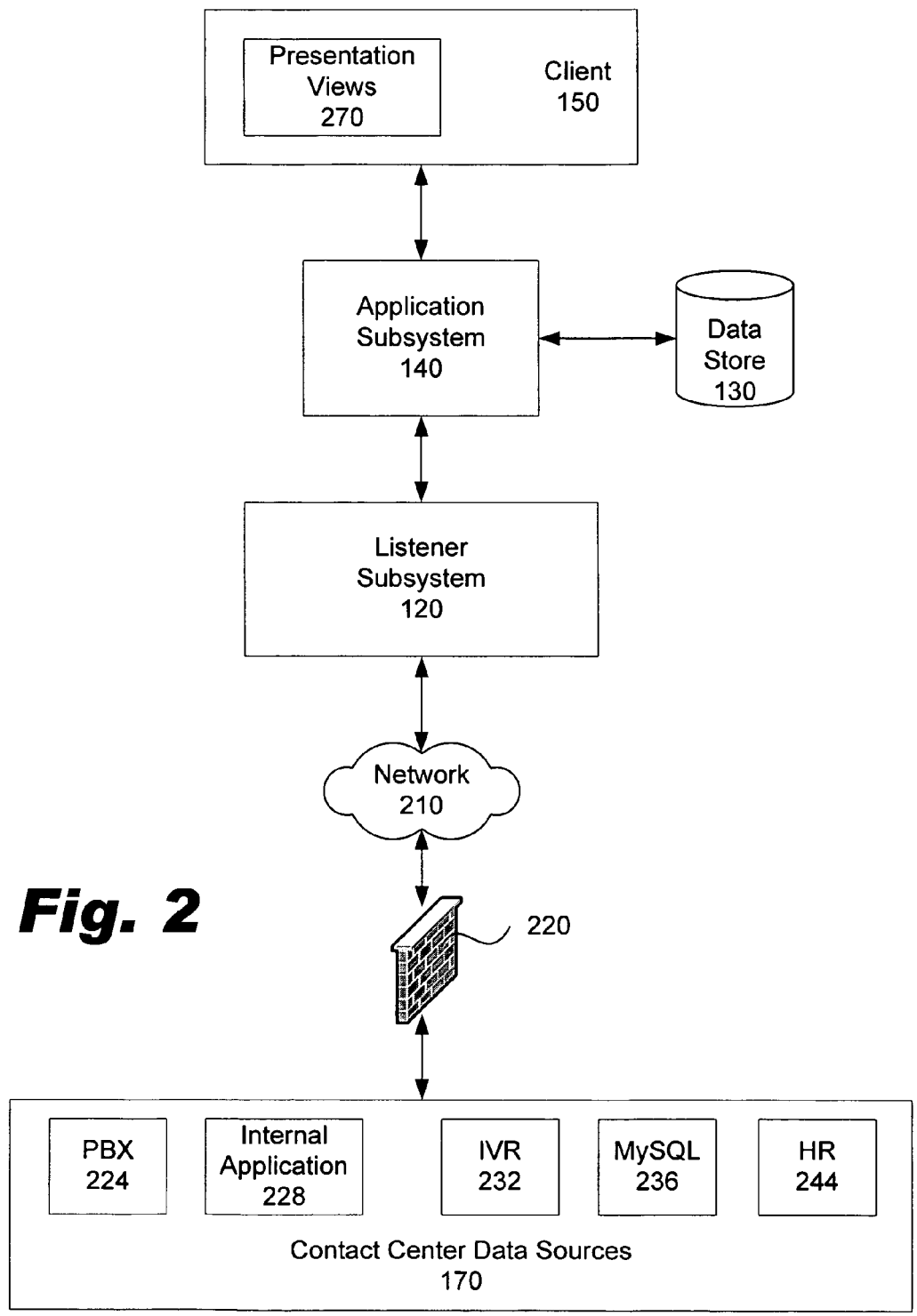
FIG. 2 is a block diagram illustrating an example of a hosted implementation of the system of FIG. 1, according to an exemplary embodiment.
Figure 3:
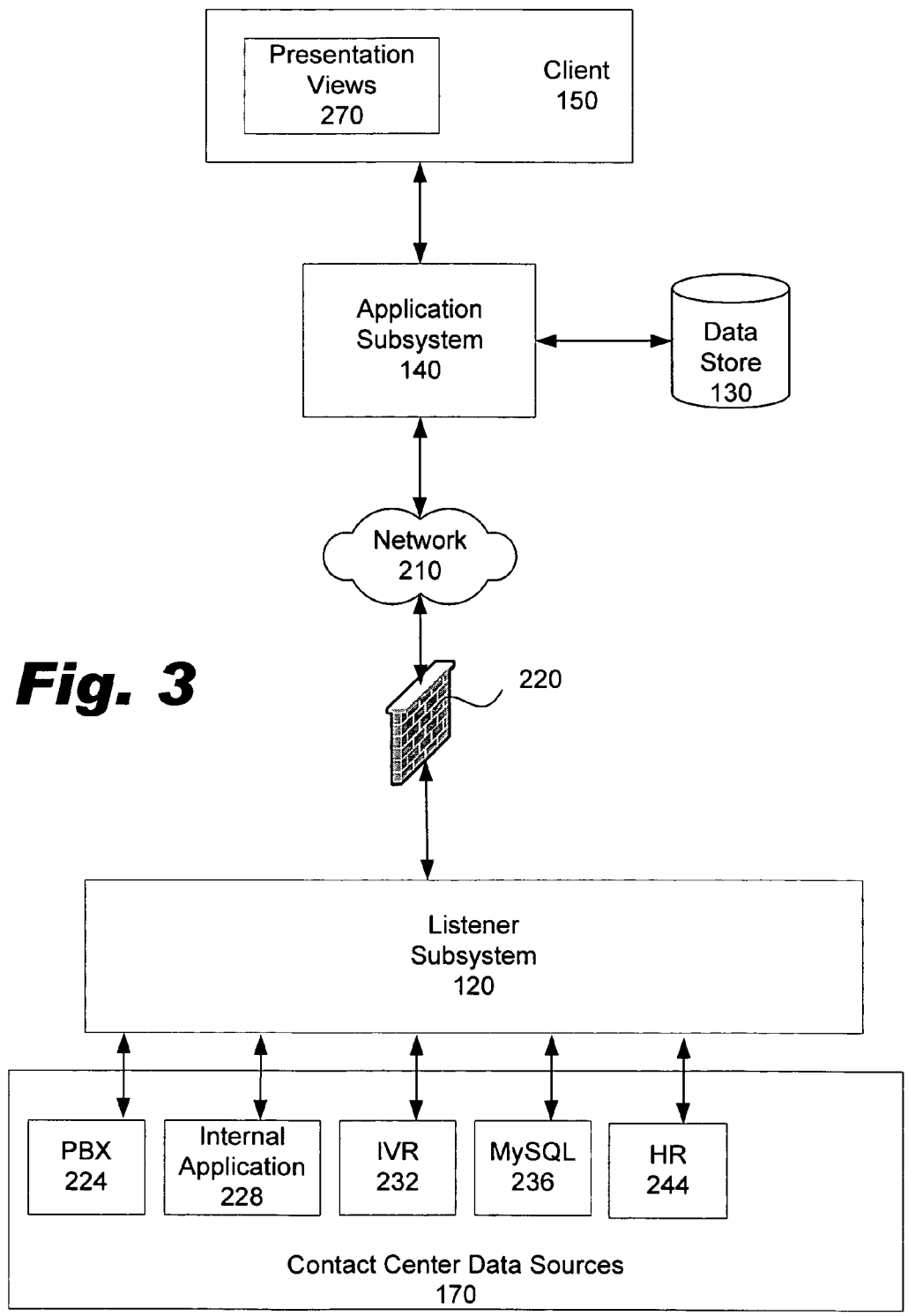
FIG. 3 is a block diagram illustrating an example of an enterprise implementation of the system of FIG. 1, according to an exemplary embodiment.

The system (100) may be implemented in a wide variety of different service-oriented configurations, including hosted configurations and enterprise configurations. FIGS. 2 and 3 are a block diagrams illustrating examples of hosted and enterprise implementations of the system (100), according to exemplary embodiments.

A. Exemplary Hosted Implementation

In FIG. 2, the system (100) is implemented in a hosted configuration in which the listener subsystem (120) is configured to remotely acquire information from the contact center data sources (170). As shown in FIG. 2, the listener subsystem (120) may be connected to the contact center data sources (170) through a network (210) and a firewall (220). The network (210) may comprise the Internet, and the firewall (220) may be in the form of any firewall known to those skilled in the art. While FIG. 2 shows the network (210) connecting the listener subsystem (120) and the contact center data sources (170), any known suitable connection (e.g., web services connections) may be used.

The listener subsystem (120) is able to receive contact center statistics over the network (210) using a secure connection such as a virtual private network ("VPN") connection, file transfer protocol ("FTP") connection, or hypertext transport protocol ("HTTP") connection. In many exemplary embodiments, web services connections are used to connect the listener subsystem (120) with the contact center data sources (170).

In the configuration shown in FIG. 2, data sources in the contact center data sources (170) are preferably accessible from the network (210) in a manner that exposes contact center data for acquisition by the listener subsystem (120). For example, the data sources may be configured or expanded to provide data in web services protocol format or other suitable format. With each data source being configured to expose data for retrieval by web services applications, the listener subsystem (140) may be easily and inexpensively interfaced with the contact center data sources (170). Accordingly, the system (100) provides a cost-effective upgrade to already deployed contact center data sources (170).

FIG. 2 illustrates several possible contact center data sources (170), including a public branch exchange ("PBX") (224), an internal application (228), an interactive voice recognition ("IVR") application (232), MySQL technology (236), and a human resources application (244), each of which is known to those of ordinary skill in the art. The contact center data sources (170) may also include other data sources, including but not limited to call analytics servers, chat and e-mail servers, and customer relationship management ("CRM") servers. The data sources preferably expose their data to the listener subsystem (120) such that the data can be monitored and acquired over the network (210). For example, the human resources application (244) may include information about the expenses of a contact center, including expenses attributable to particular agents for calculations of overhead and profitability margins. The expenses data may be exposed to the listener subsystem (120).

In the implementation shown in FIG. 2, the listener subsystem (120) is configured to forward the acquired contact center data to the application subsystem (140), which may store the data in the data store (130). As described above, the application subsystem (140) may be configured to retrieve information from the data store (130), use the retrieved data to generate agent performance metrics, associate the metrics with an agent scorecard, and send the scorecard to the client (150) for presentation to a user (160). The application subsystem (140) may send the scorecard to the client (150) over a network (e.g., the network (210)), such as the Internet, using secure web services connections.

The client (150) is configured to present the information (e.g., the scorecard) received from the application subsystem (140) for viewing by the user (160). As shown in FIG. 2, the client (150) may include or generate presentation views (270) that may be displayed on the client (150). The presentation views (270) may be in the form of visual displays, including but not limited to graphical user interfaces ("GUIs") such as web pages. The presentation views (270) may be of many different formats and may include information dynamically selected for display based on criteria associated with the particular user (160) associated with the client (150). For example, the presentation views (270) may include an agent view for agents, or a team view for team managers. The presentation views (270) may include the agent scorecard and other information generated by the application subsystem (140). Several exemplary presentation views (270) and associated information contained therein will be discussed in greater detail below.

B. Exemplary Enterprise Implementation

The system (100) may be implemented in an enterprise (i.e., distributed) configuration. In FIG. 3, the system (100) is implemented in an enterprise configuration in which the listener subsystem (120) is integrated with the contact center data sources (170). More specifically, the listener subsystem (120) is implemented behind the firewall (220) as part of the network of a contact center. This allows the listener subsystem (120) to acquire data from the contact center data sources using the data access interfaces natively provided by the data sources. Accordingly, data sources do not have to be modified to provide data access interfaces for directly exposing data to a remote application. Instead, the listener subsystem (120) may provide a loosely coupled interface with the data sources of the contact center data sources (170).

Figure 4:
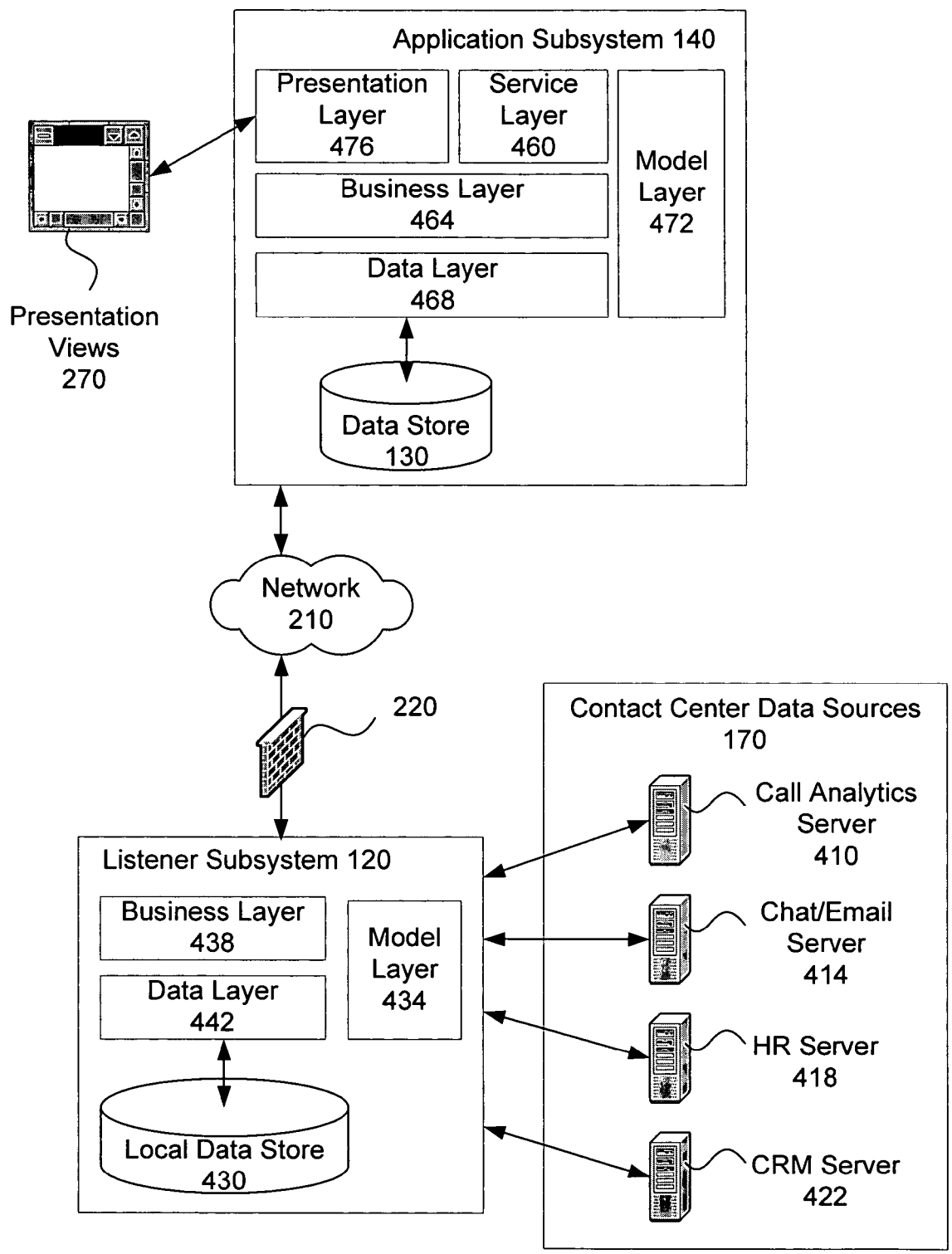
FIG. 4 is a block diagram illustrating a detailed example of the enterprise implementation of FIG. 3, according to an exemplary embodiment.

The listener subsystem (120) may acquire data and store the acquired data in a local data store (see FIG. 4; 430). The listener subsystem (120) may forward the acquired data over the network (210) to the application subsystem (140). In many exemplary embodiments, a web services connection is used to transmit the data from the listener subsystem (120) to the application subsystem (140). Accordingly, the listener subsystem (120) may be configured to package the acquired data in a web services protocol format (e.g., SOAP format) for transmission to the application subsystem (140), which may be configured for interpreting data received in web services protocol formats. The application subsystem (140), data store (130), and client (150) may function as described above to generate performance metrics from the gathered data (e.g., statistics) and to present the performance metrics in presentation views (270) for consideration by the users (160).

FIG. 4 is a block diagram illustrating a detailed example of the enterprise implementation of the system (100) as shown FIG. 3, according to an exemplary embodiment. Other embodiments and implementations of the system (100) may also include the layers shown in FIG. 4. As shown in FIG. 4, the listener subsystem (120) may be integrally configured as part of the contact center data sources (170). As discussed above, the listener subsystem (120) may acquire data from the contact center data sources (170). FIG. 4 illustrates several exemplary contact center data sources, including a call analytics server (410), a chat/e-mail server (414), a human resources server (418), and a customer relationship management ("CRM") server (422), which are well-known to those skilled in the art.

The listener subsystem (120) may include a local data store (430) to which the acquired data may be stored. The local data store (430) may include any suitable technologies and media for storing and accessing data. The local data store (430) allows the listener subsystem (120) to maintain the acquired data in case the connection with the application subsystem (140) is unavailable. The data may then be transferred when the connection becomes available.

The listener subsystem (120) may include a model layer (434), a business layer (438), and a data layer (442). The model layer (434), business layer (438), and data layer (442) may be in the form of software instructions configured to provide an interface with the local data store (430). For example, the data layer (442) may include data objects configured to call predefined procedures for storing, accessing, searching, retrieving, deleting, and performing other functions on data associated with the local data store (430).

The data layer (442) may be configured to interface with the business layer (438) and the model layer (434). Accordingly, the business layer (438) and the model layer (434) may access the local data store (430) through the data layer (442).

The business layer (438) and/or the model layer (434) may operate on data retrieved from the local data store (430) or acquired directly from the contact center data sources (170) to convert the data into any format suitable for transmission to the application subsystem (140), including web services formats. For example, the acquired data may be converted to extensible markup language ("XML") web services formats such as simple object access protocol ("SOAP") and web services description language ("WSDL"). Of course, other web services protocols may be used, including universal description discovery and integration ("UDDI") protocol. Other suitable communication formats and protocols may also be used to communicate the acquired data to the application subsystem (140), including e-mail messages, comma-separated-value files, and file transfer protocol ("FTP") messages, for example.

The application subsystem (140) includes several layers for processing data received from the listener subsystem (120) and for communicating with the clients (150). As shown in FIG. 4, the application subsystem (140) may include a service layer (460), a business layer (464), a data layer (468), a model layer (472), and a presentation layer (476). The layers exchange data between them, and each layer is typically responsible for the performance of one or more tasks. The layers may be in the form of software instructions.

In general, the service layer (460) and the presentation layer (476) can make requests to the business layer (464), which processes the requests. The business layer (464) may access the model layer (472) to provide temporary state objects that may be passed to the data layer (468). The business layer (464) may also access the data layer (468), which may request data store (130) operations parameterized by data from the model layer (472). The data layer (468) may then respond to the business layer (464) by forwarding data. The business layer (464) may perform predefined operations on the data and respond by forwarding the results of the processing to the presentation layer (476) and the service layer (460). The presentation layer (476) and the service layer (460) are able to forward the results to the clients (150). Each of the layers of the application subsystem (140) will now be described in detail.

1. Service Layer

The service layer (460) is configured to provide application subsystem (140) interfaces with the listener subsystem (120) and the clients (150). For example, the service layer (460) may be configured to interpret data received from the listener subsystem (120). In particular, the service layer (460) may be configured to unpack data that is in web-services protocol format (e.g., SOAP format). The service layer (460) may then forward the unpacked data to the business layer (464) for further processing. The service layer (460) may provide a coarse-grained or fine-grained interface to the business layer (464), as will be understood by those skilled in the art.

The service layer (460) may invoke predefined web services processes to provide web services interfaces with the clients (150). For example, the service layer (460) may invoke web services processes in response to requests for updating agent statistics, adding users, and deleting users, just to name a few. With respect to a process for updating agent statistics, for example, the service layer (460) may respond to a request from a particular client (150) for updated agent performance metrics by accessing sub-layer processes for accessing the requested information in the data store (130). For example, the service layer (460) may call a business layer (464) process for updating agent statistics. The business layer (464) may function as described below to obtain and return the requested information to the service layer (460).

2. Business Layer

The business layer (464) is configured to perform business logic functions. More specifically, the business layer (464) may include class libraries configured to model business logic used to generate the presentation views (FIG. 2; 270). For example, the business layer (464) may include predefined instructions for calculating agent performance metrics and generating agent scorecards containing the performance metrics. The calculations may be based on data retrieved from the data store (130).

The business layer (464) is configured to interface with the data layer (468) to access the data store (130). More specifically, the business layer (464) may call data layer processes that are configured to return data objects to the business layer (464). The business layer (464) may then use the data objects to perform business logic calculations. The business layer (464) may be configured to request retrieval of agent statistics, team statistics, agent statuses, performance leaders, agent scorecard data, agent bonuses, agent contests, security information, configuration information, and any other information stored in the data store (130).

The business layer (464) may include instructions for calculating performance metrics for agent scorecards. For example, a scorecard module may be configured to calculate volume, customer service, quality, and performance scores for particular agents. A volume score may refer to the number of incidents handled by an agent. This number may be the current number handled or the number handled per a given period of time. A customer service score may refer to the average score given by customers as part of a customer satisfaction feedback survey. A quality score may be calculated based on a number of predefined weighted factors, including but not limited to adherence to a work schedule, fulfillment of certification requirements, and peer ratings. A performance score may be an overall agent score calculated from other scores. For example, the performance score may factor in volume, customer service, and quality scores.

The scorecard module may be configured to calculate the monetary value added by an agent to the contact center. This value may be based on the overhead cost and/or profit margin associated with the agent. Overhead cost may refer to an amount of monetary outlays associated with the employment or contracting of the agent. For example, wages, benefits, equipment costs, lease of premises space, and other well-known expenses may be used to calculate the overhead costs associated with agents. The amount of overhead costs may be calculated from data provided by the contact center data sources (170). More specifically, expense data may be pulled from human resource databases. Profit margin may refer to a predetermined per-agent profitability goal for the contact center.

The value added by an agent may be calculated by subtracting liabilities from the income generated by the agent. Income may be based on incidents handled by the agent. For example, each incident may be pre-assigned a particular monetary value. As an agent handles incidents, their values are summed. Liabilities (e.g., overhead costs or profitability margin) may be subtracted from the sum to determine the current value (positive or negative) generated by the agent.

The business layer (464) may be configured to compare agent performance metrics with predetermined performance thresholds to determine the status of agent performance. For example, any particular measure of performance may be compared with a threshold to determine whether an agent qualifies for a bonus, reward, contest prize, and/or perk. The business layer (464) is able to determine when agents have qualified for incentives, generate a notification, and submit the notification to the presentation layer (476) for transmission to the clients (FIG. 1; 150), as described below. Further, the business layer (464) may include an illustration of performance in relation to a threshold in an agent scorecard. Agent bonus status may be stored and tracked using the data store (130).

The business layer (464) may be configured to aggregate various types and amounts of data retrieved from the data store (130). Aggregations may be calculated continually or periodically based on the frequency of updates. Aggregate data may be stored in the data store (130).

The business layer (464) may forward generated results (e.g., calculated scores or scorecards) to the presentation layer (476) and/or the service layer (460) for transmission to the clients (FIG. 1; 150). The results may be presented to users (160) in real time (or near real time) in the presentation views (270), as described below.

3. Data Layer

The data layer (468) moves data between the business layer (464) and the data store (130). In other words, the data layer (468) provides access to the data store (130). As mentioned above, the business layer (464) may access the data layer (468) by calling data layer processes, which allows the business layer (464) to read data from and write data to the data store (130).

The data layer (468) may include data access class libraries, data tables, and stored processes. A data access application block may include helper classes that provide an interface for calling the stored processes. The data layer (468) may utilize known memory interface processes and technologies to provide access to the data store (130).

4. Model Layer

The model layer (472) includes model layer data objects configured to represent data instances or groups of data instances contained in the data store (130). For example, the model layer (472) may include representations that model participants and rules of business processes. The model layer (472) provides a level of abstraction on top of the data layer (468). The model layer (472) is typically stateless and may be populated by the business layer (464) with data obtained from the data layer (468).

The model layer (472) may include and use class libraries to model actors, tasks, and performance measurements associated with contact centers. Merely by way of example, the model layer (472) may include objects for modeling agents, team leaders, administrators, agent performance scores, agent statistics, agent bonuses, agent contests, agent schedules (planned and actual), authorization, teams, team statistics, team performance scores, incidents, tasks, companies, expenses, customer satisfaction surveys, configuration information, and any other contributors to the business logic of the contact center data sources (170).

5. Presentation Layer

The presentation layer (476) may be configured to format and transmit data to the clients (FIG. 1; 150) for presentation in the presentation views (270). The data may be rendered to the clients (FIG. 1; 150) in the form of HTML, which may be presented to the users (FIG. 1; 160) using a web browser. The presentation layer (476) may include and use web pages, controls, and configuration files to render the presentation views (270). Agent scorecards may be configured for inclusion in particular presentation views (270). Exemplary presentation views (270) will be described further below.

The presentation layer (476) is able to receive and process requests from the clients (FIG. 1; 150). Typically, the presentation layer (476) sends the request to the business layer (464) for additional processing. The business layer (464) can function as described above to respond to requests from the presentation layer (476).

III. Exemplary Presentation Views

The application subsystem (140) may be configured to provide data representative of various forms of presentation views (270) to the clients (FIG. 1; 150) for presentation to the users (FIG. 1; 160). The data may be transmitted to the clients (FIG. 1; 150) in any suitable format, including HTML pages. The application subsystem (140) may include various predefined page templates for use in forming a variety of presentation views (270).

The various forms of presentation views (270) may be divided into categories of views. For example, the presentation views (270) may include, but are not limited to, agent views, team views, administrative views, and reports. The application subsystem (140) may make different categories of views available to particular user roles based on access privileges. For example, agent views may be presented to users (FIG. 1; 160) having agent roles, team views may be accessible by users (FIG. 1; 160) having team leader roles, and administrative views may be accessible by users (FIG. 1; 160) having administrative roles. When a particular user (FIG. 1; 160) logs into the system (100), the role assigned to the user (160) may be identified, and an appropriate view will be presented to the user (160).

Figure 5:
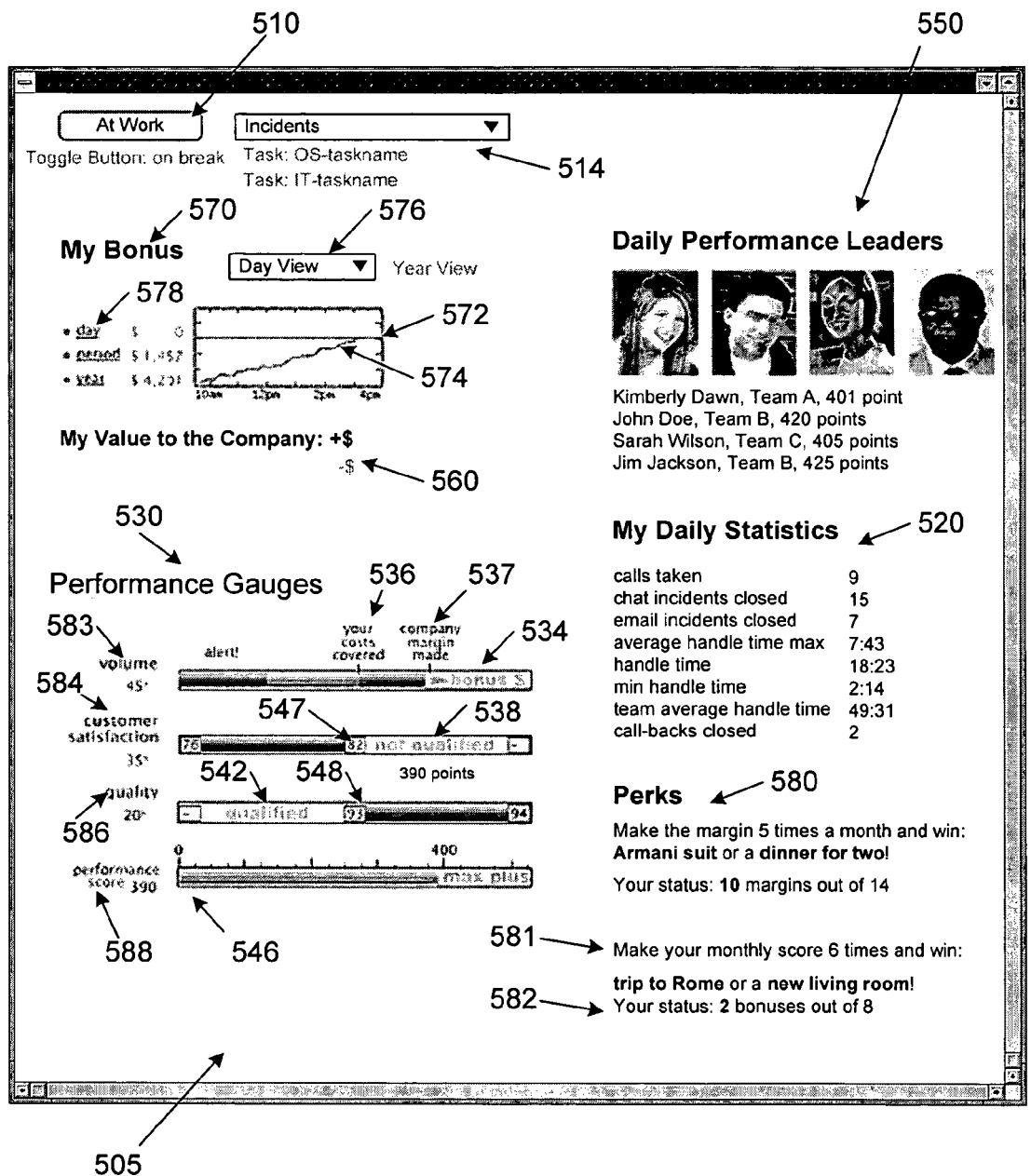
FIG. 5 is an illustration of an example of an agent view provided by the system of FIG. 1, according to one exemplary embodiment.

FIG. 5 is an illustration of an agent view (500) provided by the system (100), according to one exemplary embodiment. The agent view (500) may include a wide variety of information useful to agents, including performance metrics (505) and other information that tends to facilitate self-motivated agents. Performance metrics (505) may refer to any information that tends to indicate performance levels of agents. As shown in FIG. 5, the agent view (500) may include an agent status indicator (510), which indicates the current activity (e.g., working or on a break) of the associated agent. The agent status indicator (510) may be in the form of a toggle button that allows the agent to select his or her status.

The agent view (500) may include a task indicator (514), which indicates the type of task being worked on by the agent. The task indicator (514) may be in the form of a drop-down menu allowing the agent to select from a list of predefined tasks. Examples of agent tasks may include, but are not limited to, incidents, training tasks, operating system ("OS") tasks, and information technology ("IT") tasks. The agent may use the task indicator (514) to select the type of task that he or she will perform.

The agent view (500) may list daily statistics (520) produced by the agent. As shown in FIG. 5, examples of daily statistics (520) for the agent may include the number of calls taken, the number of chat incidents closed (i.e., resolved), the number of e-mail incidents closed, the average incident handle time, the handle time for the current incident, the minimum handle time recorded by the agent, the team average handle time, and the number of callbacks closed. Other example of daily statistics (520) may include productivity, customer satisfaction, and quality scores for the day. Examples of productivity, customer satisfaction, and quality scores will be described further below. The list of daily statistics (520) provides the agent a detailed overview of his or her performance for the day so far.

The agent view (500) may include performance gauges (530). One or more performance gauges (530) may be included to graphically illustrate the performance of an agent with respect to predefined or dynamically determined thresholds. For example, a volume gauge (534) may visually indicate a productivity (i.e., volume) score produced by the agent.

The volume score is representative of the number of incidents handled by the agent and may be presented in reference to a volume threshold (536) associated with volume that is sufficient to cover the costs (e.g., overhead) of the agent. A margin threshold (537) may also be presented to enable a visual comparison between the volume score of an agent and the volume score associated with covering the predefined profitability margin of the contact center.

By presenting agent performance information with respect to one or more thresholds associated with the overhead of the agent and the contact center profitability margin, agents can be informed of their real-time value to the contact center. In particular, agents can see the immediate value produced by the current volume of incidents handled. An agent is able to quickly determine whether his or her current performance has covered his or her costs and whether the current performance has made or exceeded the profitability margin. Consequently, agents are assisted in being motivated to meet predefined contact center goals. The knowledge of performing at a level that adds value to the contact center also tends to encourage self-motivation, and self-motivated agents are more likely to maximize their performance levels. The information displayed in the agent view (500) encourages immediate self-motivation and does so in a manner that brings agent motivation into line with the financial goals of the contact center by encouraging an ownership mentality.

Moreover, the volume gauge (534) may indicate the volume levels that will equate to bonuses for the agent. As shown in FIG. 5, when an agent surpasses the contact center margin threshold (537), the agent earns bonuses, which may be in the form of monetary payouts.

Other performance gauges (530) may also be included in the agent view (500). For example, FIG. 5 illustrates a customer satisfaction gauge (538), a quality gauge (542), and an overall performance score gauge (546). The customer satisfaction gauge (538) graphically indicates the current customer satisfaction score of the agent. The customer satisfaction score may be calculated by the application subsystem (FIG. 1; 140) based on customer survey data collected by the contact center data sources (FIG. 1; 170), as described further below.

As shown in FIG. 5, the customer satisfaction score may be indicated with reference to a predetermined customer satisfaction threshold (547). When the score reaches the threshold (547), the customer satisfaction gauge (538) may visually indicate (e.g., change color) that the agent has reached the threshold (547). The customer satisfaction gauge (538) may be configured to start from the customer satisfaction score of the previous day and adjust according to survey data received in the current day. The threshold (547) may be used to determine whether the agent qualifies for a bonus.

The quality gauge (542) graphically indicates the current quality score of an agent. Quality scores may be based on adherence to schedule, agent certifications, peer ratings, and any other factor that may indicate the quality of an agent's performance. A minimum quality threshold (548) may be displayed to indicate the minimum quality score to be reached to qualify an agent for bonuses.

The overall performance gauge (546) graphically indicates the current overall performance score of the agent. The overall performance score may be calculated by the application subsystem (FIG. 1; 140) based on aggregated performance scores associated with the performance of the agent. For example, overall performance scores may take into account volume scores, customer satisfaction scores, quality scores, and any other suitable performance measurement scores. The different scores used to calculate an overall performance score may be weighted according to a predetermined ratio. For example, the agent view (500) includes an indication that the overall performance score may comprise a scoring ratio of forty-five percent volume score, thirty-five percent customer satisfaction score, and twenty percent quality score.

The system (100) may use the overall performance scores of agents to identify performance leaders. FIG. 5 illustrates the presentation of daily performance leaders (550). In particular, specific agents having the highest overall performance scores are listed, along with their respective teams and scores. Photographs of the agents may also be displayed. The presentation of daily performance leaders (550) allows agents to compare their performances with those of the leaders. Peer comparison with top performing agents may help motivate agents to work to improve their performances.

The list of daily performance leaders (550) may be updated hourly. During the first hour of a shift, placeholders may be displayed until sufficient data is gathered to identify performance leaders.

The agent view (500) may present the value of an agent to the contact center (560). As shown in FIG. 5, the value to the contact center (560) may be displayed as a positive or negative monetary amount. The value to the contact center (560) indicates whether the agent is performing at a level that is making money or losing money for the contact center. The amount may be calculated as described above. By displaying the agent's value to the contact center (560), the system (100) encourages the agent to be self-motivated to work at a performance level that adds value to the contact center. Accordingly, agents are motivated to add value in excess of their overhead costs.

The agent view (500) may present a bonus view (570). As shown in FIG. 5, the bonus view (570) may include a graph showing a bonus threshold (572) and the performance of an agent (574) with respect to the bonus threshold (572). Agents may choose from a selection of different bonus graphs, such as graphs that cover different time periods (e.g., yearly or daily). The bonus view (570) may include a drop-down menu (576) that can be used to select from the different graphs. The bonus view (570) may also present bonus payout overviews (578). In particular, the bonus view (570) may show the amounts of bonuses paid out over a day, year, or other time period. The bonus view (570) can provide financial incentives to motivate agents based on real-time performance levels. Thus, immediate consequences may be displayed to provide an intuitive and motivational visual illustration of how performance immediately affects payout to an agent and value to the contact center.

The agent view (500) may present perks information (580). Perks may be rewards that agents can win based on predetermined performance criteria. For example, FIG. 5 shows perks in the form of a new suit, a dinner for two, a trip, or a new living room. New perks may be indicated visually. For example, an exclamation point or other visual symbol may be used to indicate that a perk is new (e.g., not yet two weeks old).

The perks information (580) typically includes predetermined criteria (581) for an agent to receive a perk and a status (582) of the agent for satisfying the criteria. For example, FIG. 5 shows an agent having reached the contact center margin (537) ten times out of a perk criterion of fourteen times.

Once an agent has satisfied the criteria for a perk, the agent view (500) may update to display a congratulations message. A reward code may also be displayed. The agent can use the reward code to collect the perk. The performance thresholds for the performance gauges (530) may be predefined by users (160) having administrative roles.

The agent view (500) may include links to additional information. For example, links (583, 584, 586, and 588) can be selected by agents to view additional information about volume, customer satisfaction, quality, and overall performance, respectively. The selection of one of the links (582, 584, 586, or 588) may cause a corresponding window pane to be presented to the agent, without directing the user (FIG. 1; 160) away from the agent view (500). In particular, a new window pane may be opened adjacent to the agent view (500), as shown in FIG. 6A. FIG. 6A illustrates the agent view (500) and a particular window pane (610) displayed adjacent to the agent view (500). The window pane (610) includes detailed information about the definition of quality and the factors and agent statistics used to calculate quality scores. The content of the window pane (610), as well as the factors used to calculate quality scores, may be preconfigured by users (FIG. 1; 160) having administrative roles.

Similarly, volume, customer satisfaction, and overall performance window panes may be opened by the links (582, 584, and 588). FIG. 6B illustrates an example of a volume window pane (620), and FIG. 6C illustrates an example of a customer satisfaction window pane (630), according to exemplary embodiments. The window panes (620 and 630) may also be opened adjacent to the agent view (500), without directing the user (FIG. 1; 160) away from the agent view (500). Additional window panes may also be configured to provide agents with additional information about any of the information presented in the agent view (500).

The presentation views (FIG. 4; 270) may display information to the user (FIG. 1; 160) in real time. The information is presented in real time to provide immediate feedback and consequences to the users (FIG. 1; 160). In accordance with principles of behavioral science, the users (FIG. 1; 160) are likely to respond to the real-time objective performance and consequences information with self-motivated performance. In general, this helps to encourage maximized productivity of agents handling messages for a call center.

IV. Exemplary Method

Figure 7:
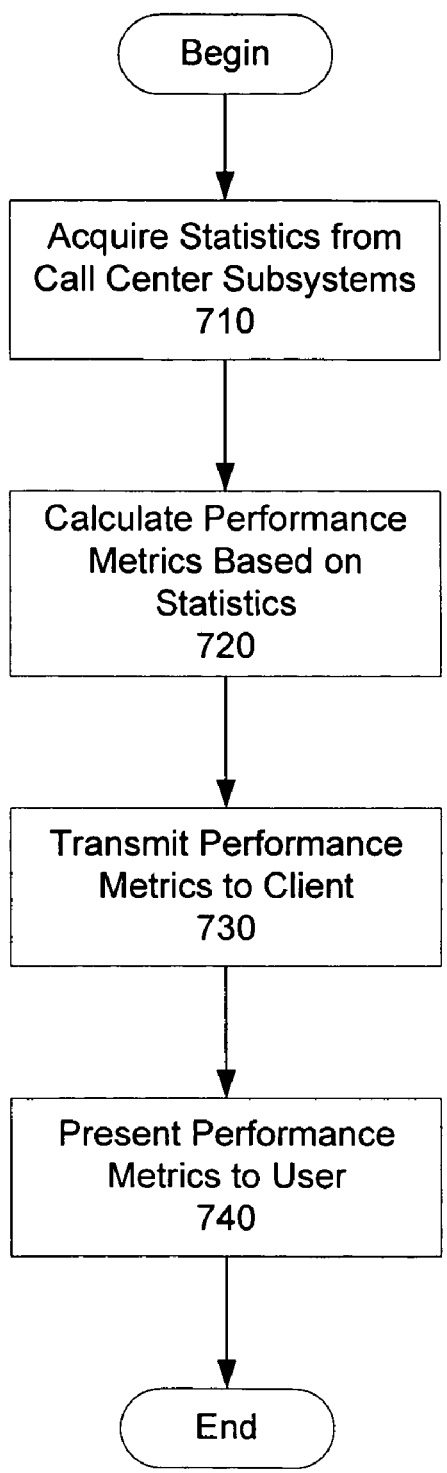
FIG. 7 is a flowchart illustrating a method of providing visual motivation for agent performance using the system of FIG. 1, according to an exemplary embodiment.

FIG. 7 is a flowchart illustrating a method of motivating agent performance using the system (FIG. 1; 100), according to an exemplary embodiment. The method of FIG. 7 begins by acquiring statistics from contact center data sources (FIG. 1; 170) (step 710). This may be performed in any of the ways described above, including by using web services technology.

Performance metrics are calculated based on the acquired statistics (step 720). This may be performed in any of the ways described above, including by using predefined heuristics.

Data representative of the performance metrics is transmitted to a client (FIG. 1; 150) (step 730). This may be performed in any of the ways described above, including by sending data configured to generate a view of an agent scorecard containing the agent performance metrics.

The agent performance metrics are presented in real time for consideration by the user (FIG. 1; 160) using the client (FIG. 1; 150) (step 740). Step 740 may be performed in any of the ways discussed above. The performance metrics may be presented as part of a scorecard in a graphical user interface, such as in the form of the agent view (500) of FIG. 5.

According to one exemplary embodiment, the present systems and methods described above may be implemented as instructions on a computer readable carrier. Program(s) of the computer readable carrier define functions of embodiments and can be contained on a variety of signal-bearing media, which include, but are in no way limited to, information permanently stored on non-writable storage media (e.g., read-only memory devices within a computer such as CD-ROM or DVD-ROM disks readable by a CD-ROM drive or a DVD drive); alterable information stored on writable storage media (e.g., floppy disks within a diskette drive or hard-disk drive or read/writable CD or read/writable DVD); or information conveyed to a computer by a communications medium, such as through a computer or network, including wireless communications. The latter embodiment specifically includes information downloaded over the Internet and other networks. Such signal-bearing media or computer readable carriers, when carrying computer-readable instructions that direct functions of the present systems and methods, represent embodiments of the present systems and methods. In many embodiments, the systems and methods are implemented as software programs configured to instruct operations on one or more server devices.

V. Another Exemplary System View

Figure 8:
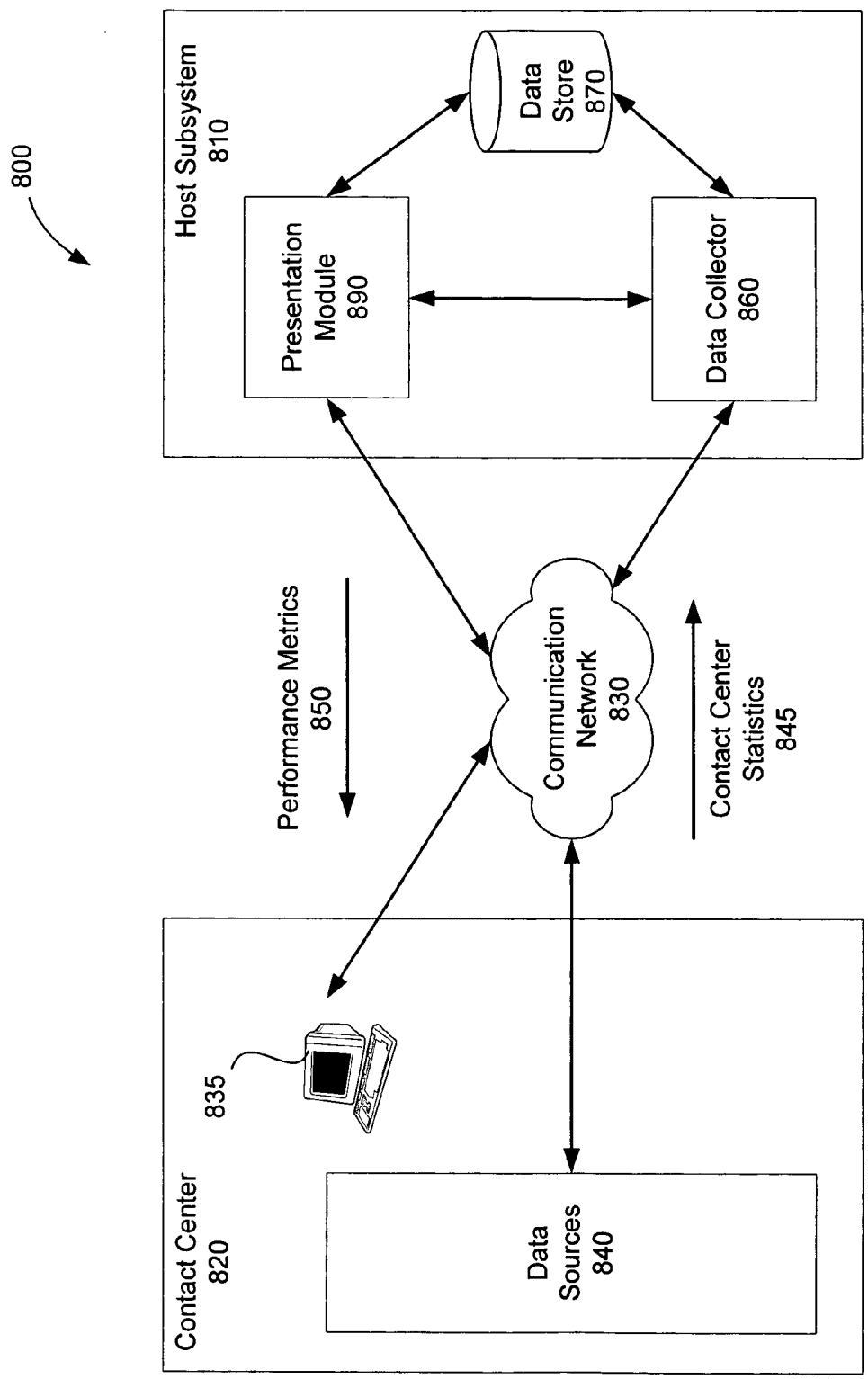
FIG. 8 is a block diagram illustrating another exemplary performance motivation system, according to an embodiment.

FIG. 8 illustrates another exemplary performance motivation system (800), according to an embodiment. As shown in FIG. 8, the system (800) may include a host subsystem (810) configured to communicate with a contact center (820) over a communication network (830). The communication network (830) may include one or more networks suitable for carrying communications between the contact center (820) and the host subsystem (810). For example, the communication network (830) may include, but is not limited to, the Internet, World Wide Web and/or one or more intranets, local area networks, wide area networks, voice communication networks (e.g., the Public Switched Telephone Network ("PSTN"), Voice over Internet Protocol ("VoIP"), and wireless telephone networks), access networks, packet-switched networks, circuit-switched networks, and any other communications networks capable of carrying communications between the contact center (820) and the host subsystem (810). The communication network (830) may include any devices, media, and technologies helpful for carrying communications between the contact center (820) and the host subsystem (810).

The contact center (820) may include one or more client devices (835) that are accessible to contact center agents. The agents can use the client devices (835) for handling communications with customers communicating with the contact center (820), as will be understood by those skilled in the art. The client devices (835) may include any of the items and functions described above in relation to the clients (150) shown in FIG. 1. The contact center (820) may include any other technologies that are useful for supporting communications between contact center agents and customers, including any such technologies known in the art.

As described further below, the client devices (835) may be configured to receive performance metrics (850) from the host subsystem (810) and present the performance metrics (850) for consideration by contact center agents. While FIG. 8 shows the client device 835 as being part of the contact center (820), this is not limiting. One or more of the client devices (835) may be located remote of and communicatively coupled to the contact center (820) to allow contact center agents to work from locations other than the location of the contact center (820).

The contact center (820) may include data sources (840) configured to collect and transmit data representative of contact center statistics (845) ("statistics (845)") to the host subsystem (810). The data sources (840) may collect the statistical data as call center agents perform tasks (e.g., handle incidents). The data sources (840) may include, but are not limited to, any of the contact center data sources (FIG. 1; 170) described above, sources of customer relationship management data, e-mail data, chat data, instant messaging data, human resources data, accounting data, call analytics data, and customer satisfaction survey data. The data sources (840) may include any known technologies (e.g. call center management information applications) for gathering contact center statistics (845) and transmitting them to the host subsystem (810) over the communication network (830). In certain embodiments, the data sources (840) include customer satisfaction survey applications configured to present survey questions to customers and receive answers to the survey questions from the customers.

In certain examples, when any particular contact center agent handles an incident with a customer (e.g., a customer service telephone conversation with the customer), the contact center (820) may present a customer satisfaction survey to the customer to provide the customer with an opportunity to give feedback about the incident and/or the agent. The contact center (820) may be configured to either automatically present the customer satisfaction survey to the customer or instruct the agent to initiate the customer satisfaction survey. For example, the contact center (820) may be configured to instruct the agent transfer the customer to an automated customer satisfaction survey application.

The contact center (820) may assign a survey identifier (e.g., a ticket number) to each customer satisfaction survey instance. The contact center (820) may assign the survey identifier automatically and may instruct the agent to provide the survey identifier to the customer satisfaction survey application configured to operate the survey. For example, the agent may be instructed to enter the identifier using the client device (835). For instance, if the client device (835) includes a telephone, the agent may provide the survey identifier by using either the telephone keypad or voice recognition technologies to enter the identifier. The survey identifier may be used to associate survey data with corresponding incidents or agents.

Once the customer is transferred to the customer satisfaction survey application, the application presents survey questions to the customer. The survey may be presented using the same communication technologies that the customer used to interact with the agent. In certain embodiments, the contact center (820) is configured to present customer surveys by presenting pre-recorded audio messages to the customer. In other embodiments, customer survey messages may be presented in text form (e.g., web-based, instant messaging, or e-mail messages).

The contact center (820) may be configured to receive survey answers from the customer. The survey answers may be received in any suitable form, including Dual Tone Frequency Modulated ("DTMF") signals, audio signals, web messages, e-mail message, etc. The contact center (820) may be configured with voice-recognition technologies useful for receiving information from customers.

The contact center (820) may be configured to detect and respond to a lack of survey answers (e.g., the customer does not provide an answer to a question) or to errors associated with receipt of survey answers. For example, the customer satisfaction survey application may be configured to detect silence lasting longer than a predetermined time interval and/or when answers are not recognizable (e.g., the customer mumbles). The customer satisfaction survey application can track the number of errors detected for each question and/or for each survey and to perform specific actions when a predetermined number of errors has been detected. This helps minimize the chances of the customer becoming annoyed by repeated errors or error messages. In certain embodiments, for example, the customer satisfaction survey application is configured to provide an error message (e.g., "I'm sorry. I'm having trouble hearing you.") when a first error is detected. If a second error is detected, the customer satisfaction survey application may be configured to move on to the next question in the survey or to end the survey. The maximum number of allowable errors for a question or for the entire survey may be set to any suitable number by a system administrator.

Examples of customer satisfaction survey questions include, but are not limited to, "How would you rate the time it took to provide a solution?"; "How about the ease of access to the agent?"; How would you rate the agent's professionalism and willingness to listen?"; "How would you rate the agent's technical knowledge?"; and "Did you receive a satisfactory solution to your problem?". The customer satisfaction survey application may be configured to instruct the customer to provide answers in accordance with a predefined scale. For example, the above-listed questions may be answered with "Good," "Bad," or "OK." These answers may be associated with a numerical scale to allow the customer to use a numerical keypad to enter survey answers and to allow the answers to be used to calculate customer satisfaction scores. The contact center (820) may collect customer satisfaction survey data and include the data in the statistics (845) for transmission to the host subsystem (810), as described above. By including survey data in the statistics (845), the system (800) is able to base performance metrics (850) on customer satisfaction, which may help motivate agents to perform in manners that are pleasing to customers.

The statistics (845) may include any data representative of the performance of the contact center (820), including measurements of the performance of contact center agents. For example, the statistics (845) may include, but are not limited to data representative of customer satisfaction scores, customer satisfaction survey questions and/or answers, incidents handled by agents, incidents resolved by agents, time worked by agents, schedule adherence information, call-back information, time spent handling incidents, contact center expenses (e.g., agent overhead costs), and any above-described data associated with the performance of a contact center.

The statistics (845) may be transmitted from the call center (820) to the host subsystem (810) via the communication network (830) using one or more suitable communication technologies. For example, the statistics (845) may be transmitted using one or more of e-mail messages, simple mail transfer protocol ("SMTP") protocol, FTP messages, HTTP messages, asynchronous transfer mode ("ATM") messages, real-time transfer protocol ("RTP") messages, Ethernet messages, web services messages (e.g., simple object access protocol ("SOAP")), and any other suitable communication technologies. In certain embodiments, statistics (845) are represented in comma-separated-value files attached to e-mail messages that are transmitted to the host subsystem (810). Accordingly, the contact center (820) may be configured to transmit data to the host subsystem (810) using one or more data formats, and the host subsystem (810) may be configured to receive the data in those formats.

Different categories or types of information included in the statistics (845) may be transmitted from the contact center (820) to the host subsystem (810) in different messages. For example, multiple e-mail messages each including a different category of data may be sent. For instance, a first e-mail message may include customer satisfaction data, a second e-mail may include call incident data, and a third e-mail may include call statistics data.

The contact center (820) may be configured to transmit the statistics (845) to the host subsystem (810) in real time, in near real time, in accordance with a predefined schedule, or periodically. In certain embodiments, the contact center (820) is configured to provide the statistics (845) to the host subsystem (810) in real time or near real time. In other embodiments, the contact center (820) is configured to provide batches of statistics periodically (e.g., every 15 minutes, 30 minutes, or hour).

While FIG. 8 shows only one contact center (820) in communication with the host subsystem (810), this is not limiting. One or more contact centers such as contact center (820) may be configured to communicate with the host subsystem (810). Because the host subsystem (810) is flexible and can be readily configured to handle one or more different communication platforms, formats, and protocols, the host subsystem (810) is capable of communicating with multiple contact centers, even when the contact centers use different communication platforms, protocols, and formats. This enables the host subsystem (810) to be conveniently and effectively configured to work with different contact centers.

The host subsystem (810) may also be configured to interface with contact centers such as the contact center (820) in a manner that minimizes the intrusion upon the contact centers. As shown in FIG. 8, the host subsystem (810) may be implemented remotely of the contact center (820) in a hosted architecture to limit the physical intrusion to the contact center (820). This architecture can be especially beneficial when operators of contact centers are reluctant to give a third party internal access to the contact centers because the flexibility of the host subsystem (810) allows contact centers to be easily adapted to interface with the host subsystem (810), including the contact centers collecting and communicating the statistics (845) to the host subsystem (810).

The host subsystem (810) may be configured to receive the statistics (845) from the contact center (820), use the statistics (845) to calculate performance metrics (850), and transmit the performance metrics (850) to the contact center (820) for presentation to one or more contact center agents. As shown in FIG. 8, the host subsystem (810) may include a data collector (860) configured to receive the statistics (845) from the contact center (820) and to calculate the performance metrics (850), a data store (870) configured to store data (e.g., the statistics (845) and the performance metrics (850)), and a presentation module (890) configure to interface with the contact center (820) over the communication network (830), including transmitting the performance metrics (850) to one or more of the client devices (835) associated with the contact center (820).

The elements of the host subsystem (810) may include or be implemented in one or more computers (e.g., servers). The host subsystem (810) may include any computer hardware and/or instructions (e.g., software programs), or combinations of software and hardware, configured to perform the processes described herein. In particular, it should be understood that the host subsystem (810) may be implemented on one physical computing device or may be implemented on more than one physical computing device. Accordingly, the host subsystem (810) may include any one of a number of computing devices known to those skilled in the art (e.g., one or more servers), and may employ any of a number of computer operating systems known to those skilled in the art, including, but by no means limited to, known versions and/or varieties of the Microsoft Windows® operating system, the Unix operating system, and the Linux operating system.

Accordingly, those skilled in the art will recognize that the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The data collector (860) may include or be implemented in one or more computing devices (servers). In certain exemplary embodiments, the data collector (860) is implemented in one or more BizTalk servers provided by Microsoft Corporation of Redmond, Wash. BizTalk implementations of the data collector (860) provide significant flexibility and scalability-capable of supporting different deployment scenarios and additional capacity. BizTalk implementations of the data collector (860) also support different communication platforms, protocols, and formats (e.g., web services) such that the data collector (860) can be interfaced with contact centers (820) operating different communication technologies.

Figure 9:
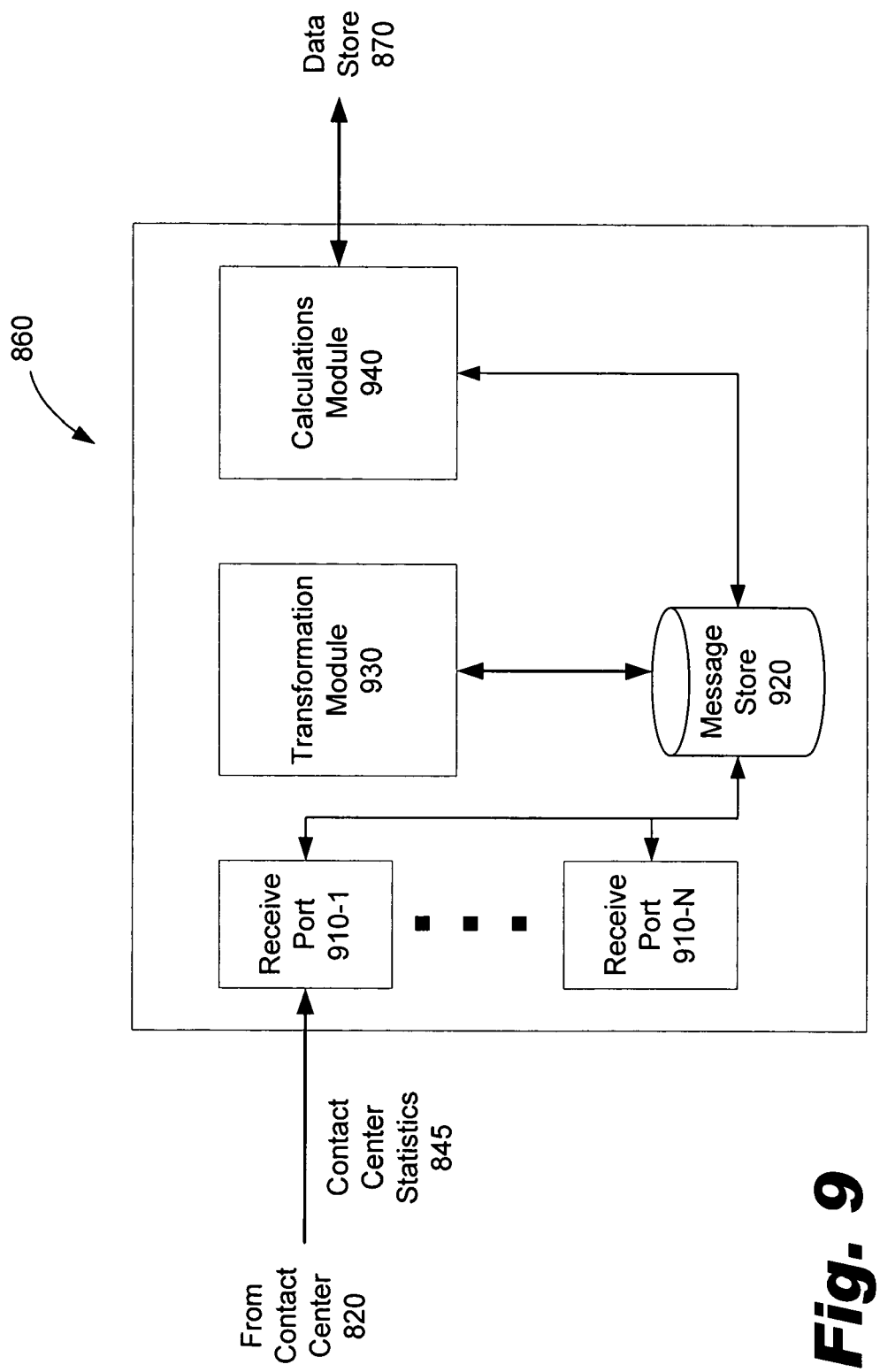
FIG. 9 is a block diagram illustrating exemplary elements of the data collector of FIG. 8, according to an embodiment.

FIG. 9 illustrates exemplary elements of the data collector (860), according to an embodiment. As shown in FIG. 9, the data collector (860) may include one or more receive ports (910-1 through 910-N) (collectively "the receive ports (910)") configured to receive the statistics (845) from the contact center (810), a message store (920) for storing and queuing received messages, a transformation module (930) configured to transform the received data from the received message format to one or more other data formats, and a calculations module (940) configured to calculate the performance metrics (850) from the received data and/or any historical data stored in the data store (870).

One of more receive ports (910) may be configured to receive the contact center statistics (845) from one or more contact centers such as the contact center (820). In certain embodiments, one receive port (910) may be configured to receive a particular type of communication (e.g., a communication having a specific transport, format, or protocol).

Each of the receive ports (910) may be configured to validate and disassemble the received data. Any particular receive port (910) may be customized for receiving and processing data from a particular contact center. The receive ports (910) may perform authentication and authorization functions to verify that received data is from an authentic source and that the source is authorized to update the data. The received ports (910) may also be configured to verify that received data satisfies predefined characteristics, which verification is useful for verifying that data is reliable (e.g., not corrupted). The receive ports (910) may include adapters configured to process certain types of communications. In certain exemplary embodiments, one or more of the receive ports (910) includes an adapter (e.g., a post office protocol "POP3" adapter) configured to receive and process e-mail messages. Of course, other adapters (e.g., a web services protocol adapter) may be used for different types of messages.

The receive ports (910) may be configured to disassemble and convert received data messages. In one embodiment, the receive ports (910) are configured to convert the received data messages to XML messages. The XML messages are in forms that are influenced by the formats of the received data messages. Thus, the XML messages may include custom schema that is based on the schema of the originally received messages. In certain embodiments, the receive ports (910) may be configured to convert received data in a first format (e.g., a comma-separated-value file attached to an e-mail message) to another format (e.g., XML). The receive ports (910) may include any suitable technologies helpful for converting data, including any known flat file disassembler. The XML messages having custom schemas may be subsequently transformed to an internal core schema, as described below.

The message store (920) may be configured to store the converted data provided by the receive ports (910) and to queue the data for transformation by the transformation module (930). Because of its queuing capabilities, the message store (920) enables related data received non-sequentially, on different receive ports (910), or at different times to be aggregated into complete sets for transformation.

The message store (920) may include functions configured to separate the receipt of data with the operations to be performed on the data. The message store (920) may include queuing and mapping functions for separating the receipt of data from the subsequent processing of the data. Queuing functions may be provided by any suitable queue technology, including SQL servers or Microsoft Message Queue technology provided by Microsoft Corporation of Redmond, Wash. Any suitable technology may be used to implement mapping functions and tables, including one or more SQL servers.

The data collector (860) may include operations management functions for controlling processing of the data received and stored in the message store (920). The operations management functions may initiate processing of the data upon receipt of the data, periodically, or in accordance with predetermined criteria. Any operations management technologies known to those skilled in the art may be used, including such technologies included in BizTalk servers provided by Microsoft Corporation of Redmond, Wash.

The transformation module (930) is configured to receive or acquire data from the message store (920) and transform the data to an internal core data schema supported by the calculations module (940). The transformation module (930) may include predefined heuristics defining mappings between one or more original data schemas (e.g., data schemas associated with the contact center (820)) to the internal data schema. For a specific original data schema, a corresponding heuristic can be used to map the original data schema to the internal data schema. In certain embodiments, the internal data schema is a specific core XML schema, and the transformation module (930) is able to transform original data schema in converted message into one or more XML messages that conform to the internal core schema. Any suitable mapping and transformation technologies may be used, including BizTalk Maps and/or other such technologies that are known to those skilled in the art.

The heuristics implemented in the transformation module (930) may be configured to queue received data until a complete set of related data is received and can be combined and transformed. This is useful when a set of data depends on different incoming data feeds. For example, if a set of data comes from different data sources (840), the transformation module (930) can wait until the complete set of data has been received before transforming the data set. The received data may include correlation information identifying related data.

The transformation module (930) may be configured to send the transformed data (i.e., core schema messages) to the message store (920), which can store the data and/or send the data to the calculations module (940) for further processing. The calculations module (940) is able to process core schema-based data. By configuring the receive ports (910) and the transformation module (930) to convert and transform received data to a specific core data schema, the calculations module (940) is easily interfaced with contact centers supporting different communication and data technologies, without having to reconfigure the calculations module (940) for different communication technologies.

The calculations module (940) may be configured to calculate the performance metrics (850) from the converted data stored in the message store (920) and/or from data (e.g., historic data) stored in the data store (870). By being able to use both data stored in the message store (920) and the data store (870), the calculations module (940) is able to account for instances in which data is received out of order and/or instances in which current data is not complete and historic data is used to fill in for the missing data. For example, if a customer does not provide an answer to a customer satisfaction survey question, calculations module (940) is able to recognize a deficiency in the converted data and access and use historic customer satisfaction data in the data store (870) to fill in for the missing data. In certain embodiments, the calculations module (940) is configured to use an average of historic customer satisfaction scores to fill in for missing customer satisfaction data. Historic data may be similarly used for other missing contact center statistics (845). The system (800) may be configured to take a snapshot of performance metrics (850) at any suitable time and use the snapshot as historic data for purposes of calculating current performance metrics (850). Performance scores included in the performance metrics (850) may be defined as percentages of predefined maximum performance scores.

The calculated performance metrics (850) may be used to determine consequences that will be delivered to agents. The consequences may be in any acceptable form and may be designed to motivate agents to improve their performances. The consequences are typically in the form of positive immediate feedback. For example, consequences may include, but are not limited to, information presented to one or more agents, acknowledgment of agents who are performing at or above a certain performance level, rewards, financial incentives, bonuses, perks, public acknowledgement of the highest performing agents, visual representations of performance in relation to predetermined goals or objectives, presentation of data representative of value added to the contact center (820)

by agents, and any other consequence that may tend to motivate the behavior of agents toward improving performance.

The performance metrics (850) may include any of the performance measurement data described above, including any of the performance metrics (505) shown in FIG. 5. The performance metrics (850) may be based on any contact center data, including the statistics (845) described herein. In an exemplary embodiment, the performance metrics (850) include a productivity matrix (also referred to as a volume matrix), a quality matrix, and a customer satisfaction matrix. The productivity matrix includes productivity scores that are measures of the number of incidents handled by an agent during a predetermined time period (e.g., daily or per work shift).

Each incident may be predefined as a discrete money-making event having a static cost and margin. Accordingly, the number of incidents handled by an agent and the overhead of the agent can be used to calculate the current profitability of the agent. The overhead may be based on any costs associated with an agent, including, but not limited to, wages, benefits, and facilities costs. Incidents may also include tasks worked by an agent, where the value of the tasks being measured by the amount of time spent working the task. This allows the performance metrics (850) to take into account value measured per event, value measured by time, or both.

A productivity goal may be defined in advance by the agent, a team leader, or an administrator. The productivity goal may be used as a threshold to determine when an agent becomes eligible to earn bonus points. For example, an agent may be determined to be eligible for a bonus when the productivity of the agent surpasses the productivity goal. The productivity goal may be based on the overhead of an agent and may be defined as a predetermined margin above the overhead. Thus, the margin attained by an agent may be determined by subtracting the overhead of the agent from the total number of incidents handled by the agent.

Bonus points can be used to track whether the agent qualifies for a bonus, which may be a monetary reward. Thus, the agent can earn a bonus once his or her productivity surpasses a predetermined threshold (e.g., the productivity goal) by a predetermined margin, assuming that the agent maintains adequate quality and customer satisfaction scores, as described below. Bonus points may be accumulated over any suitable time interval (e.g., daily, yearly, etc.). A predetermined number of bonus points can be set as a threshold at which an agent will earn a bonus.

Once the agent meets the productivity goal, then the quality matrix and the customer satisfaction matrix may be used as thresholds to determine whether the agent continues to qualify for bonus points. Predefined quality and customer satisfaction thresholds may be set and used to determine whether the quality scores and customer satisfaction scores qualify the agent for bonus points. If the customer satisfaction score or quality score for an agent falls below the corresponding threshold, the system (800) may be configured to zero the agent's bonus and/or bonus points.

In an exemplary embodiment, the quality score is based on a first contact closure percentage and a call monitoring percentage. These two percentages may be averaged or weighted to determine a quality score. The first contact closure percentage may be a measure of the percent of initial contacts that an agent is able to resolve during the first contact. The call monitoring percentage may be a subjective score entered by a manager (e.g., a team leader or administrator) of the contact center (820). The manager may selectively monitor an interaction between an agent and a customer and provide a call monitoring score based on the observed performance of the agent.

In other embodiments, quality scores may be based on different criteria, including schedule adherence, peer review, and certifications scores, as described above. The system (800) is flexible in that it can be easily configured to define performance measurements (e.g., quality measurements) in accordance with the preferences of different contact centers. Accordingly, the system (800) can be customized to interface with different contact centers to provide an elegant and tailored solution for measuring agent performance and for motivating agents to improve their performances.

In an exemplary embodiment, the customer satisfaction score is based on the overall customer satisfaction rating of an agent as determined from the feedback that customers provide in response to a customer satisfaction survey. The customer satisfaction score may be an average of the feedback received for the agent. The customer satisfaction score may also take into account a predetermined industry customer satisfaction score. The calculations module (940) may be configured to update a customer satisfaction score whenever survey data is received and associated with an incident handled by an agent. Any suitable identifiers (e.g., ticket numbers) may be used to associate customer service data with incidents.

The customer satisfaction scores may be defined as percentages of a predetermined maximum customer satisfaction score. The scores may be per survey question or per survey (i.e., per incident). The customer satisfaction scores can be averaged to determine an average score over a specific time period (e.g., daily). As mentioned above, historic customer satisfaction scores may be used when customer satisfaction scores are not received or are not complete for any given incident.

Performance points may be determined and used as described above to measure the performance of an agent with respect to other agents. One or more agents having the highest performance points may be acknowledged, including presenting the agents as "top performers" in an interface viewable by the agents of the contact center (820).

Agents may also receive predefined perks as rewards for performance over a predetermined period of time, as described above. Perks may include a group of agent-selectable prizes or any form of reward described above. Perks may be defined to reward consistently good agent performance. For example, the system (800) may reward an agent with a perk when the productivity scores of the agent are consistently above a predetermined threshold (e.g., a profitability margin) during the predetermined period of time. Of course, other performance scores can be used to govern when perks are awarded. The system (800) may be configured to aggregate performance scores for use in calculating perk scores, as well as for reporting purposes.

As mentioned above, processing of the statistics (845), including the calculations of the performance metrics (850), may be performed periodically, or whenever new data is received or changed.

Returning now to FIG. 8, the data collector (860) may be configured to provide calculated performance metrics (850) to the presentation module (890) and/or to the data store (870) for storage. The data store (870) may include any technologies for storing electronic data, including any of the technologies described above in relation to the data store (FIG. 1; 130).

The system (800) may be configured to update data stored in the data store (870). For example, historical performance metrics (850) may be updated to account for newly received statistics (845).

The presentation module (890) may access and retrieve data stored in the data store (870), including the stored performance metrics (850). The presentation module (890) is configured to transmit the performance metrics (850) and related information to the contact center (820) over the communication network (830). One or more client devices (e.g., the client device (835)) associated with the contact center (820) may receive the performance metrics (850) and be configured to present (e.g., display) the performance metrics (850) for consideration by the agents using the client devices. Accordingly, the presentation module (890) can inform contact center agents of their performance metrics (850), as well as the consequences that are based on the performance metrics (850).

The performance metrics (850) and other information provided by the presentation module (890) may be presented on the client device (835) being used by the agent associated with the performance metrics (850) in any of the forms and ways described above in relation to the system (100), including inserting data representative of the performance metrics (850) in a scorecard that is transmitted to the client device (835) for visual display. The scorecard may be similar to and include information similar to that shown in the agent view (500) shown in FIG. 5. Accordingly, agents can consider the information received from the presentation module (890) in a manner that tends to influence the behavior of the agents, as described previously. In particular, visual indicators illustrate for agents whether the performance of the agents is adding value to the contact center (820) and whether the agents are meeting predetermined goal thresholds. The information also illustrates the consequences associated with agent performance, including whether agents qualify for bonuses.

As described above, views presented to agents may be presented in real time, near real time, in accordance with a schedule, periodically, or whenever performance metrics (850) are updated. The agents preferably receive the information quickly enough that the information is meaningful and tends to motivate improved performance.

Specific views may be presented to agents, and other views may be made available to team leaders and administrators associated with the contact center (820). A team leader may be provided with access to a team view (e.g., a team web page) illustrating performance metrics (850) and other information for the agents on one or more teams. Overall team performance metrics may also be presented. The team leader may also be provided with access to the agent view of any agent on the team, as well as access to other agent information, including an agent's customer satisfaction matrix, quality matrix, performance metrics (850), and performance/bonus goals and thresholds. The team leader may manually enter or update certain information for agents on the team, including, for example, certain performance scores such as an agent's first contact closure and call monitoring scores, which may then be used by the system (800) to calculate quality scores as described above. The team leader may also define incidents that an agent is allowed to handle, update the agent's work shift, and enter other information associated with the agent.

An administrator may be provided with access to one or more administrator views that enable the administrator to perform administrative operations, including, but not limited to, adding, deleting, and updating agent profiles, manually entering performance scores (e.g., customer satisfaction survey scores), managing team memberships, setting and modifying thresholds (e.g., bonus criteria), setting and modifying factors associated with overhead and margin thresholds, defining, modifying, and deleting customer satisfaction survey questions, and any other administrative function helpful for the operation of the system (800).

The system (800) may employ any suitable security, encryption, authentication, authorization, and/or data validation technologies, including any security technologies known to those skilled in the art. The system (800) may be configured to notify the contact center (820) when invalid, insecure, or incomplete data is received. The notifications may be transmitted over the communication network (830).

While FIG. 8 shows a hosted architecture, other configurations may be employed. For example, the data collector (860), or at least certain elements and functions of the data collector (860) may be integrated with the contact center (820) in a distributed architecture. In such configurations, the data collector (860) can collect data from the data sources (840) locally and transmit the data (e.g., statistics (845)) to other elements of the host subsystem (810). The communication of the data from the data collector (860) included in the contact center (820) to other elements of the host subsystem (810) may be performed in any of the ways described above, including e-mail, FTP, or web services messages. In certain embodiments, data collection functions of the data collector (860) may be integrated with the contact center (820), and communications capabilities of the data collector (860) (e.g., web services) may be implemented at the host subsystem (810).

In certain embodiments, one or more receive ports (910) of the data collector (860) may be integrated with the contact center (820). The receive ports (910) may function as described above to receive data (e.g., statistics (845)) from the data sources (840), convert the data to custom schema-based data formats (e.g., XML messages with one or more custom schemas), and send the converted data to the message store (920) located at the host subsystem (810). Alternatively, a first message store (920) may be integrated with the contact center (820) and may be configured to send the converted data to a second message store (920) located at the host subsystem (810). The converted data may be sent over the communication network (830) using any communication technology or technologies described above (e.g., web services).

The flexibility of the host subsystem (810) for interfacing with different types of communication platforms and technologies enables a combination of hosted and distributed architectures to be used. For example, a first contact center may use a hosted architecture for communicating with the host subsystem (810), and a second contact center may use a distributed architecture for communicating with the host subsystem (810). That is, the first contact center may send its statistics (845) to a data collector (860) implemented at the host subsystem (810), and the second contact center may include a data collector (860), or at least a subset of the elements and functions of the data collector (860), configured to communicate with the host subsystem (810) by way of the communication network (830).

In certain alternative embodiments, the host subsystem (810) may be located at or proximate to the location of the contact center (820). In these embodiments, the host subsystem (810) and the contact center (820) may communicate using any suitable short or medium range communication technologies such as local area networks.

The preceding description has been presented only to illustrate and describe examples of the present methods and systems. It is not intended to be exhaustive or to limit the present methods and systems to any precise form disclosed. Many modifications and variations are possible in light of the above teaching. For example, while exemplary systems and methods have been described with reference to call center implementations, applications other than call center applications may similarly be interfaced with and utilize the functions of the present systems and methods.

The foregoing embodiments were chosen and described in order to illustrate principles of the methods and systems as well as some practical applications. The preceding description enables others skilled in the art to utilize the methods and systems in various embodiments and with various modifications as are suited to the particular use contemplated. It is intended that the scope of the methods and systems be defined by the following claims.

What is claimed is:

1. A system comprising:
a data collector configured to receive data representative of contact center statistics from a contact center and to use said statistics to calculate performance metrics; and
a presentation module configured to provide data representative of said performance metrics to a client device configured to present said performance metrics for consideration by an agent associated with the contact center, said performance metrics being representative of an agent performance in relation to at least one predefined performance threshold; wherein said data collector includes:
a receiving port configured to receive said statistics in a first data format and convert said statistics to a second data format, a message store configured to queue said statistics in said second data format for further processing, a transformation module configured to transform said statistics in said second data format to an internal schema, and a calculations module configured to calculate said performance metrics from said statistics represented in said second data format having said internal schema;
comparing said performance metrics with said predefined performance threshold to determine a status, said status being configured to indicate an immediate consequence of a user performance with respect to said performance threshold, associate said performance threshold with said status and a scorecard such that real-time presentation of said scorecard includes presentation of said performance threshold and said status for consideration by the user; the system further comprising an automatic reward, automatically provide said automatic reward to the user when said user performance reaches said performance threshold, and transmitting a notification of said automatic reward for real-time presentation to the user.

2. The system of claim 1, wherein at least a subset of said at least one receive port, said message store, and said transformation module are integrated with the contact center in a distributed architecture.

* * * * *